United States Patent [19]
Ellers

[11] Patent Number: 5,336,894
[45] Date of Patent: Aug. 9, 1994

[54] UNIVERSAL INFRARED HEAT SOURCE CONTROLLER

[75] Inventor: Eric Ellers, Okinawa, Japan

[73] Assignee: The United States of America as represented by the Secretary of the Air Force, Washington, D.C.

[21] Appl. No.: 871,782

[22] Filed: Apr. 21, 1992

[51] Int. Cl.$^5$ .............................................. G21K 5/04
[52] U.S. Cl. ............................ 250/504 R; 250/505.1; 250/515.1; 73/167; 364/551.01
[58] Field of Search ............. 250/493.1, 503.1, 504 R, 250/504 H, 505.1, 515.1; 73/865.6, 167; 364/550, 551.01, 579

[56] References Cited

U.S. PATENT DOCUMENTS

| | | | |
|---|---|---|---|
| 3,487,216 | 10/1969 | Webb | 250/84 |
| 3,960,000 | 6/1976 | Barnett et al. | 73/15.4 |
| 4,173,777 | 11/1979 | Schmit et al. | 362/253 |
| 4,480,372 | 11/1984 | Wirick et al. | 29/458 |
| 4,482,252 | 11/1984 | Lorenz | 356/448 |
| 4,621,265 | 11/1986 | Buse et al. | 342/169 |
| 4,737,792 | 4/1988 | Grone | 342/169 |
| 4,935,881 | 6/1990 | Lowenson et al. | 364/550 |

*Primary Examiner*—Paul M. Dzierzynski
*Assistant Examiner*—David V. Bruce
*Attorney, Agent, or Firm*—Bernard E. Franz; Thomas L. Kundert

[57] ABSTRACT

The controller for a single infrared source is capable of being programmed to act as a target for an AIM-9 target seeker. Data are read by the controller comprises (a) temperature data, (b) aperture data, (c) shutter-filter data, and (d) missile ID data. The controller includes a microprocessor CPU, with a program stored in a read only memory. The CPU reads aperture data from the stand, compares the data to signals derived from a potentiometer coupled to an aperture wheel, operates a motor to select an aperture on the wheel, and then sends an aperature ready signal to the stand. For temperature control, the black body is part of a resistance bridge circuit. A plurality of MOSFETs are used to select a value of resistance for a reference voltage in the bridge. The CPU reads temperature data from the stand and uses it to control the MOSFETs. An instrumentation amplifier across a diagonal of the bridge has its output coupled to a transistor circuit which controls power to the bridge, which thereby controls the temperature and resistance of the black body. The CPU reads shutter-filter data from the stand, and uses the data to generate signals to control solenoids for a shutter and two filters which are part of the IR heat source. A black body protection circuit opens a solid state relay to disable the 24-volt power supply to the bridge when the thermocouple indicates a temperature of approximately 905 degrees C. The results of testing this circuit shows that the fuse for the 24-volt supply will blow or the black body temperature will be maintained at approximately 905 degrees.

5 Claims, 9 Drawing Sheets

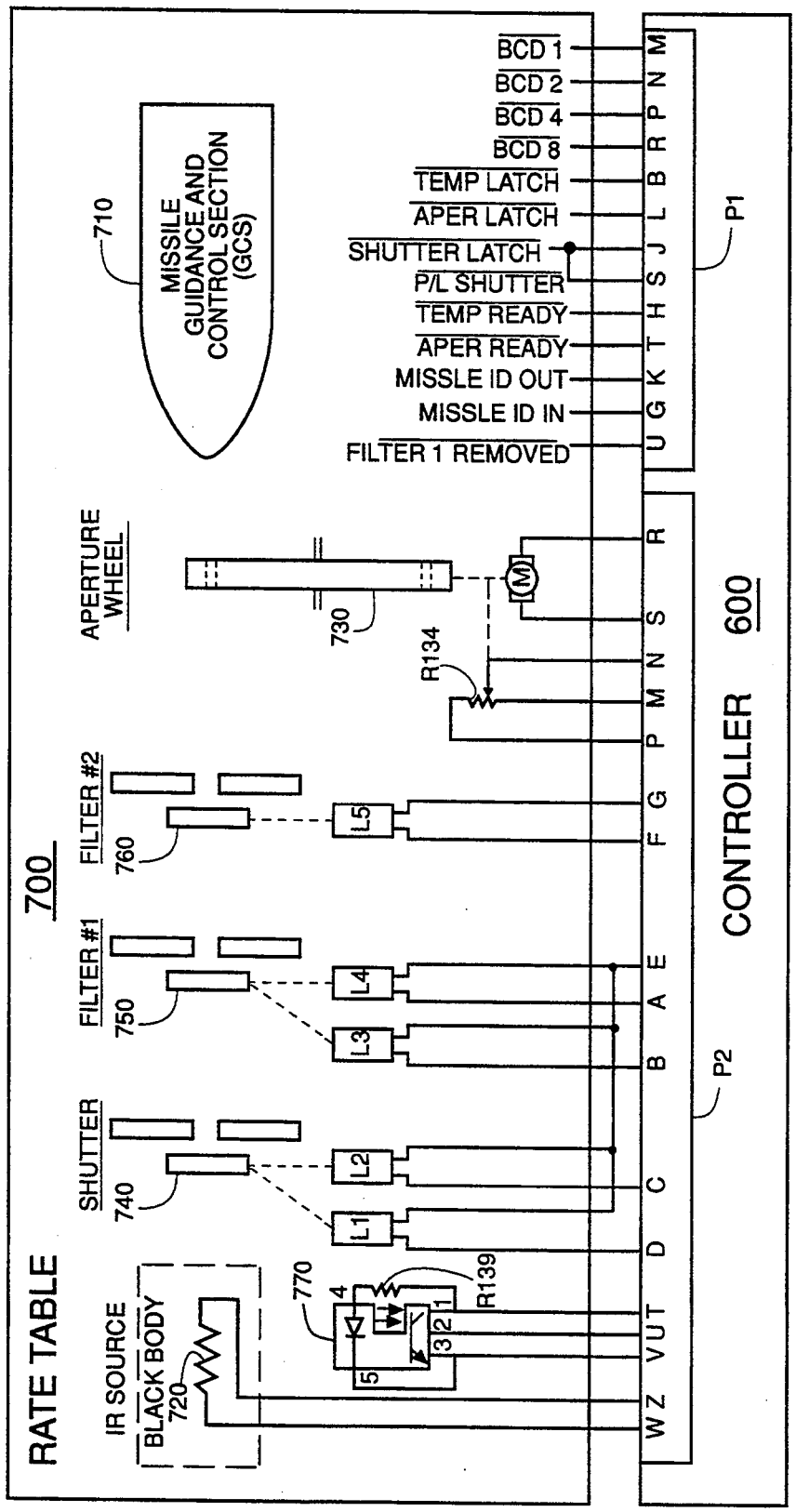
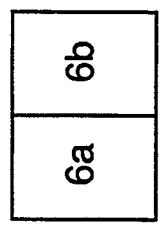
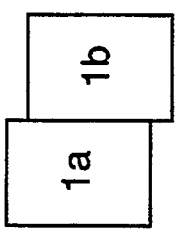

UNIVERSAL INFRARED HEAT SOURCE CONTROLLER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a universal infrared heat source controller, and more particularly to a controller for a single infrared source capable of being programmed to act as a target for a missile target seeker.

A previous test system in use requires two controllers and two heat sources. Each controller must use its own heat source. It is necessary to switch from the operation of one controller to the other. The switching procedure involves: 1. Removing the heat source that is in the collimating tube and placing it on the provided holding shelf. 2. Unplugging the interface cable from the one controller and plugging it into the one to be used. 3. Performing the recommended calibration after switching controllers. The disadvantage to the system is that it is time consuming and also causes wear on the cabling. The disadvantages to the controllers are: 1. The heat sources are not provided with adequate protection. Heat sources burn up on a yearly basis. 2. Lack of support for repair and calibration of the controllers from the manufacturer. 3. Some of the circuitry in the controllers is unreliable. Repeatability of the controllers is not as good as it needs to be and they need frequent repairs.

United States patents of interest include U.S. Pat. No. 4,480,372, to Wirick et al, which describes a target for calibrating and testing infrared devices. Barnett et al, in U.S. Pat. No. 3,960,000, supply energy to a heat source 13 used to test a missile 11. The heat source is operated by a controller 14 connected to a programmer 15. Heat energy impinging on IR cell 17 actuates a detector 18. In U.S. Pat. No. 4,482,252, Lorenz discusses a calibration method and apparatus for optical scanners used to scan cloudscapes or landscapes from above the earth in an aircraft or spacecraft. Operation in the infrared area of the optical spectrum is described. U.S. Pat. No. 4,621,265 to Buse et al describes a simulator array and method for evaluating the tracking capability of a passive target seeker. In U.S. Pat. No. 4,737,792 to Grone, a counter-based simulated target generator is used to generate signals for testing a radar system.

SUMMARY OF THE INVENTION

An objective of the invention is to correct a heat source problem and to eliminate controller problems.

The invention relates to a controller for a single infrared source capable of being programmed to act as a target for an AIM-9 target seeker GCS (Guidance and Control Section). It is constructed for operation as part of an automatic test equipment system for testing a guidance and control section of missiles of different types, and can be operated manually or remotely. In either mode the controller is capable of selecting any temperature, aperture and shutter-filter combination. Four different kinds of data are read by the controller, namely (a) temperature data, (b) aperture data, (c) shutter-filter data, and (d) missile ID data. After data is read and decoded by a microprocessor, action is taken on each kind of data by separate circuitry. The unit contains internal protection circuitry for the most critical components.

Advantages of the invention are: 1. A single heat source is used to do what the previous system does with two heat sources. 2. The controller is programmable and can accommodate future needs. A new feature relates to protection circuitry for the heat source. The heat source is protected from being over heated by component failure or miscalibration.

The controller includes a CPU using a microprocessor, with a program stored in a programmable read only memory.

The heat source includes an aperture wheel having a plurality of apertures rotated by a motor. A potentiometer is mechanically connected to the motor and aperature wheel to indicate its position. The controller reads aperture data from the stand, compares the data to digital signals derived from the potentiometer by analog to digital conversion, operates the motor to select an aperture as designated by the data, and then sends an aperature ready signal to the stand.

The controller reads missile identification data from the stand. Operation is controlled depending on missile type (AIM-9P, AIM-9L, or AIM-9M).

For temperature control, the black body is part of a voltage divider which is one side of a resistance bridge circuit. A voltage divider forming the other side of the bridge provides a reference voltage. A plurality of MOSFETs are used to select a value of resistance to determine the value of the reference voltage. A transistor circuit between a 24-volt power supply and the top of the bridge controls the power to the black body. An instrumentation amplifier is connected across the diagonal of the bridge to compare the reference voltage to a voltage determined by the resistance of the black body, which is a function of its temperature. The CPU reads temperature data from the stand, converts it to a temperature code, and uses it to select the MOSFETs. The instrumentation amplifier output is coupled to the transistor circuit which controls power to the bridge, which thereby controls the temperature and resistance of the black body. When the black body is at the designated temperature, the differential voltage across the diagonal of the bridge and the inputs of the instrumentation amplifier is approximately zero.

The CPU reads shutter-filter data from the stand, and uses the data to generate signals to control the solenoids for a shutter and two filters which are part of the IR heat source. The control of the solenoids depends on the missile type.

The controller includes a temperature ready circuit coupled to a thermocoupe integrated into the black body for indicating to the CPU whether the black body is heating, cooling, or stabilized. A temperature-ready signal is sent to the stand when the temperature has stabilized. A black body protection circuit opens a solid state relay to disable the 24-volt power supply to the bridge when the thermocouple indicates a temperature of approximately 95 degrees C. The results of testing this circuit shows that the fuse for the 24-volt supply will blow or the black body temperature will be maintained at approximately 95 degrees. A light on the front panel of the controller will indicate the overheat condition.

BRIEF DESCRIPTION OF THE DRAWING

FIG. 7 is a block diagram of a test system using the controller of FIG. 6.

DETAILED DESCRIPTION

Figure 1A:
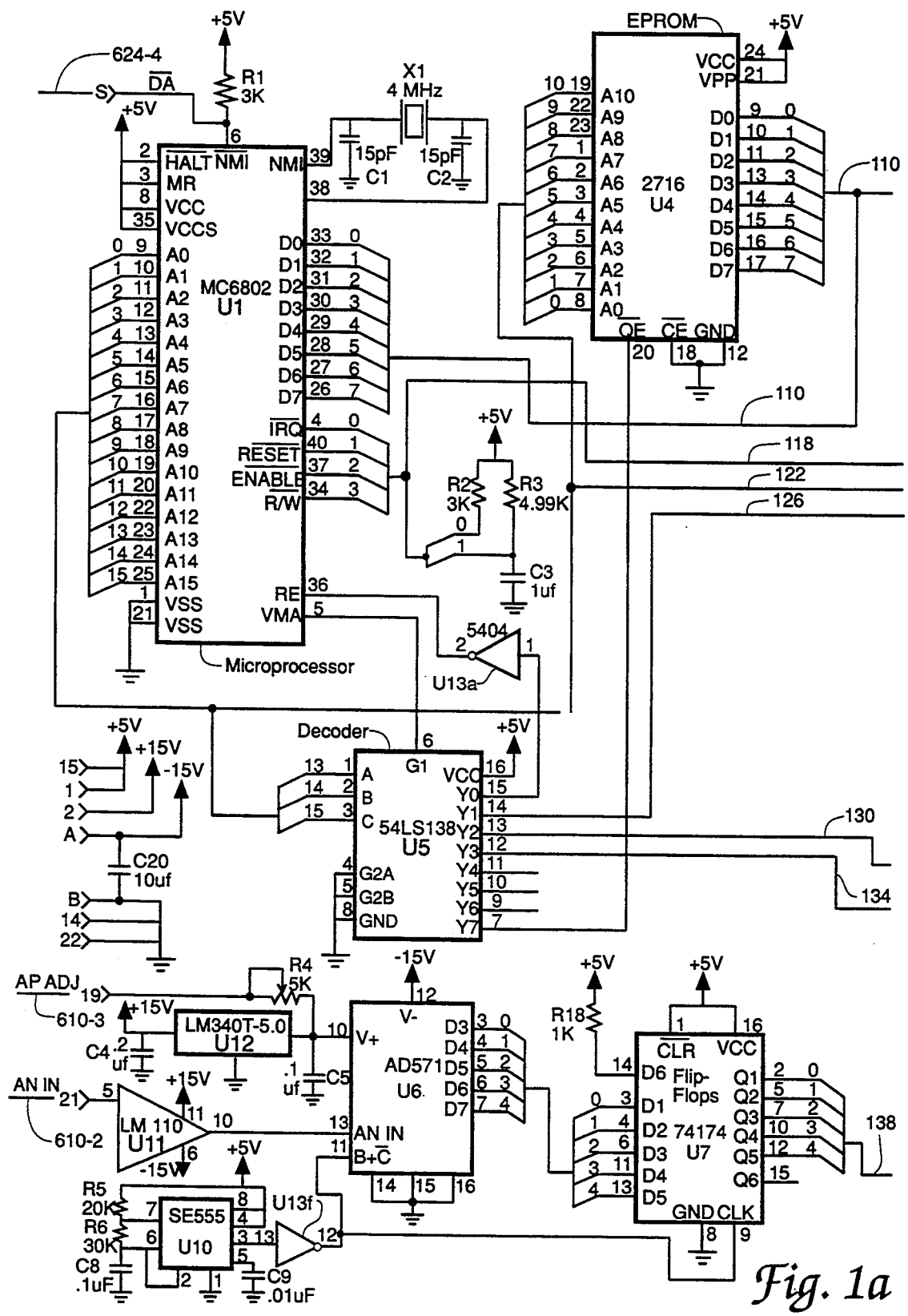
FIGS. 1a and 1b arranged as shown in FIG. 1 comprise a schematic diagram of a CPU card.

An AIM-9 target seeker basically comprises a gyro, optics, a refrigerated detector unit (RDU), and an amplifier. The gyro tracks a target under the control of the guidance and control section which contains the electronics to guide the missile. Together the gyro and optics condition and focus the energy radiating from the target onto the surface of the RDU. The RDU is very sensitive to the energy radiating from the target and converts the energy into electronic signals. The signals are amplified and sent to the electronics section in the guidance and control section. The guidance and control section contains the servo section and the electronics section. The servo section applies torque to the fins of the missile and causes them to rotate which gives the missile mobility during flight. The electronics section uses the amplified signals from the seeker to control the servo section.

The difference between the 9P, 9L and 9M models is the sensitivity of the seekers, and the ability of the guidance and control sections to detect and to avoid countermeasures without losing the original target. The 9P seeker is the least sensitive and the 9P guidance and control section is least able to avoid countermeasures. The 9M is the most sensitive and most able to avoid countermeasures.

The purpose of the testing is to verify failures that were detected on a field test set and correct them. The testing differs for each of the three models because of the great differences between them in sensitivity and countercountermeasures. Also physical construction requires that testing be done differently on each model.

The existing test system is described in a technical manual TO 21M-AIM9L-3-16-1 titled "Procedures for RATE TABLE TEST POSITION FOR AIM-9P/L/M MISSILE PART NUMBER 153525", change 5-1 September 1987, published under authority of the Secretary of the U.S. Air Force, a copy of Section 1 of this manual being attached hereto as an appendix and incorporated by reference. Also attached as appendices and incorporated by reference are descriptions from manuals, one comprising three pages titled "Manual Rate Table Test Station" which was produced by Ford Aerospace & Communications Corporation for training and reference material for operators, identified at the bottom of each page as TRAIN/MRTTS:33; one comprising pages numbered 5-9 titled Section III, Theory of Operation", with "9L/9P IR Source Controller" handwritten at the top", which is part of a maintenance and operating manual written by Electro Optical Industries, the contractor that built the IR Source Controller for the 9L and 9P Guidance Sections, and only refers to the 9L and 9P IR Source and Controller; and one numbered as pages 9-19 titled Section 5 "Theory of Operation", with "9M IR Source Controller" handwritten at the top, which is also part of a maintenance and operation manual written by Electro Optical Industries, and only refers to the 9M Source and Controller.

The technical manual TO 21M-AIM9L-3-16-1 has figures showing a rate table, and descriptions of controllers. The Rate Table Test Position is used to integrate the servo, electronic, and seeker sections and perform the final acceptance of the AIM-9P, AIM-9L, and AIM-9M Guidance and Control Section (GCS). The rate table test position will automatically perform the final acceptance test of the AIM-9P, AIM-9L, and AIM-9M GCS. The final acceptance may also be performed manually. The AIM-9L and AIM-9M integration tests may be performed both automatically and manually. The AIM-9P integration test is performed manually only. Section I contains a description of the rate table test position, location, and function of the special controls and indicators, and theory of test.

The rate table test position as described in the technical manual consists of three equipment consoles, an automatic control console, and rate table assembly. The figures and description cover a Bay 1 Console, a Bay 2 Console, a Bay 3 Console, an Automatic Control Console, the Rate Table, an AIM-9P Measurement Panel, an AIM-9P Control Panel, an AIM-9L Measurement Panel, an AIM-9L Control Panel, an AIM-9M Measurement Panel, and an AIM-9M Control Panel.

UNIVERSAL INFRARED HEAT SOURCE CONTROLLER

The invention relates to a single infrared source controller that is capable of being programmed to set up a target for any AIM-9GCS (Guidance and Control Section) in the Air Force inventory. It is designed to be used in target simulation on the Automatic Rate Position-AIM-9P/9L/9M, and operated as part of an automatic test equipment system. It can be operated manually or remotely. It also contains internal protection circuitry for the most critical components.

The purpose of the invention was to correct the old AIM-9P/9L heat source problem and eliminate the new problems that arose with the addition of the 9M controller.

Figure 1B:
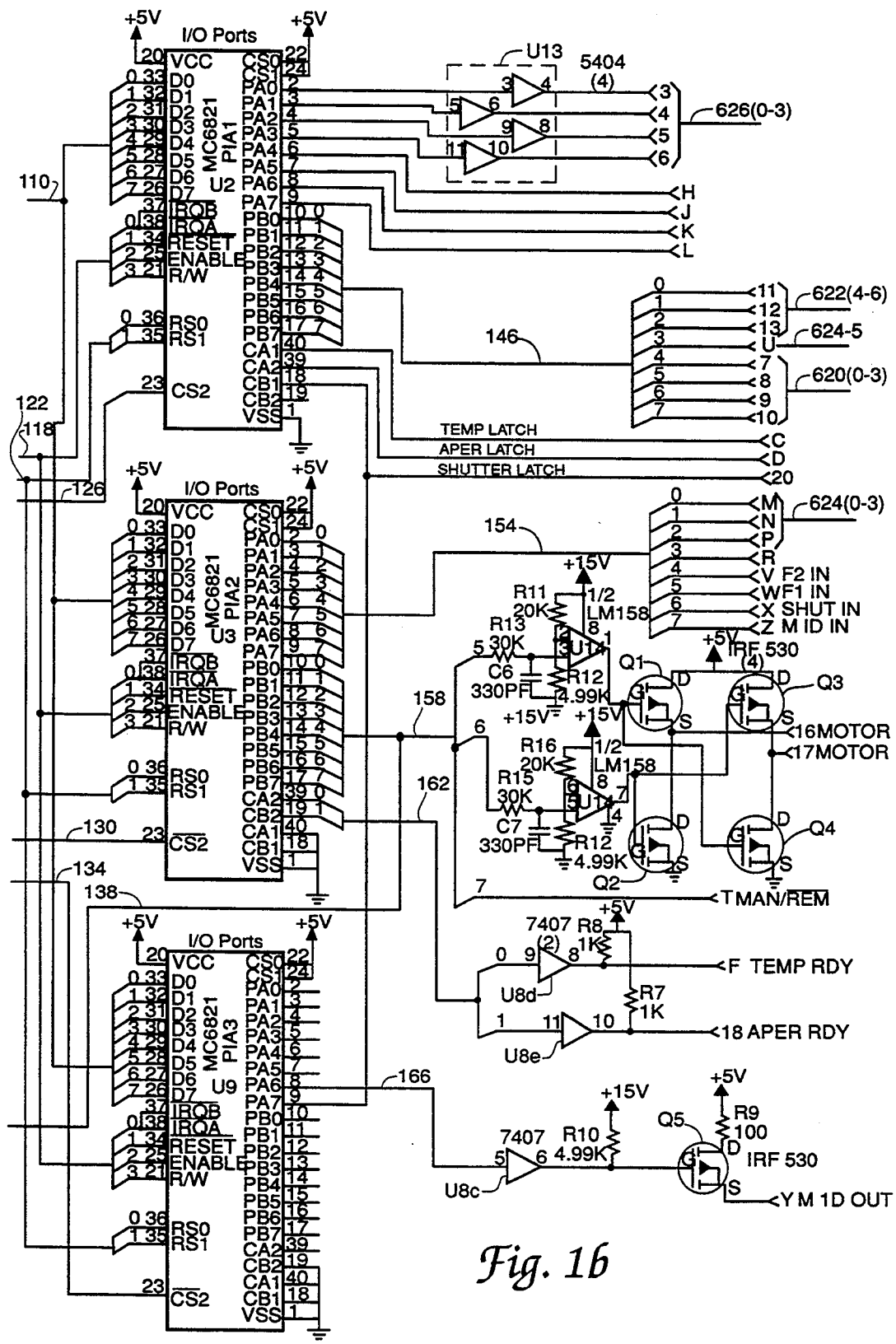
Figures 2, 2A:
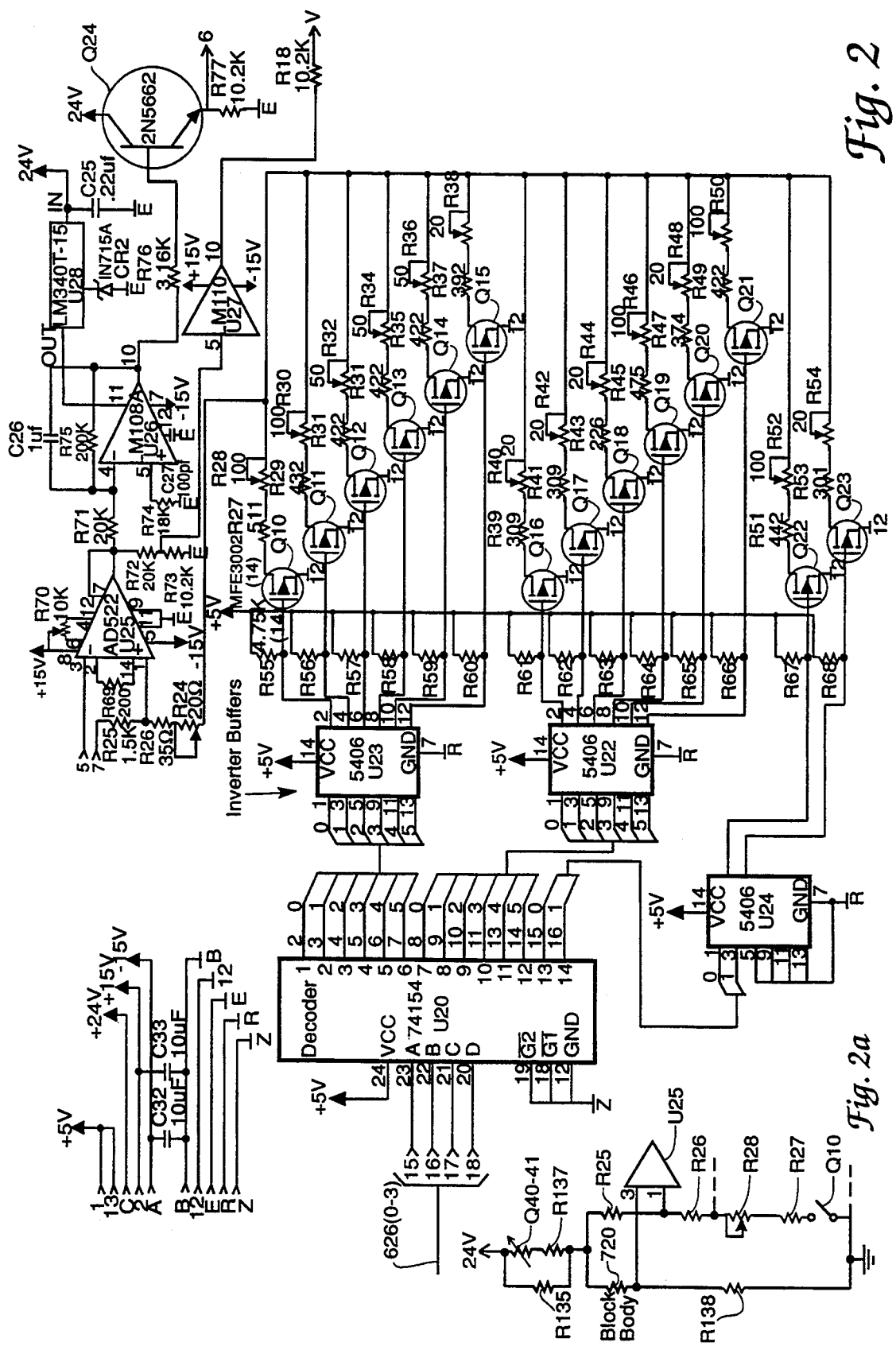
FIG. 2 is a schematic diagram of a temperature select card.
FIG. 2a is a simplified diagram of a temperature control bridge.
Figure 3:
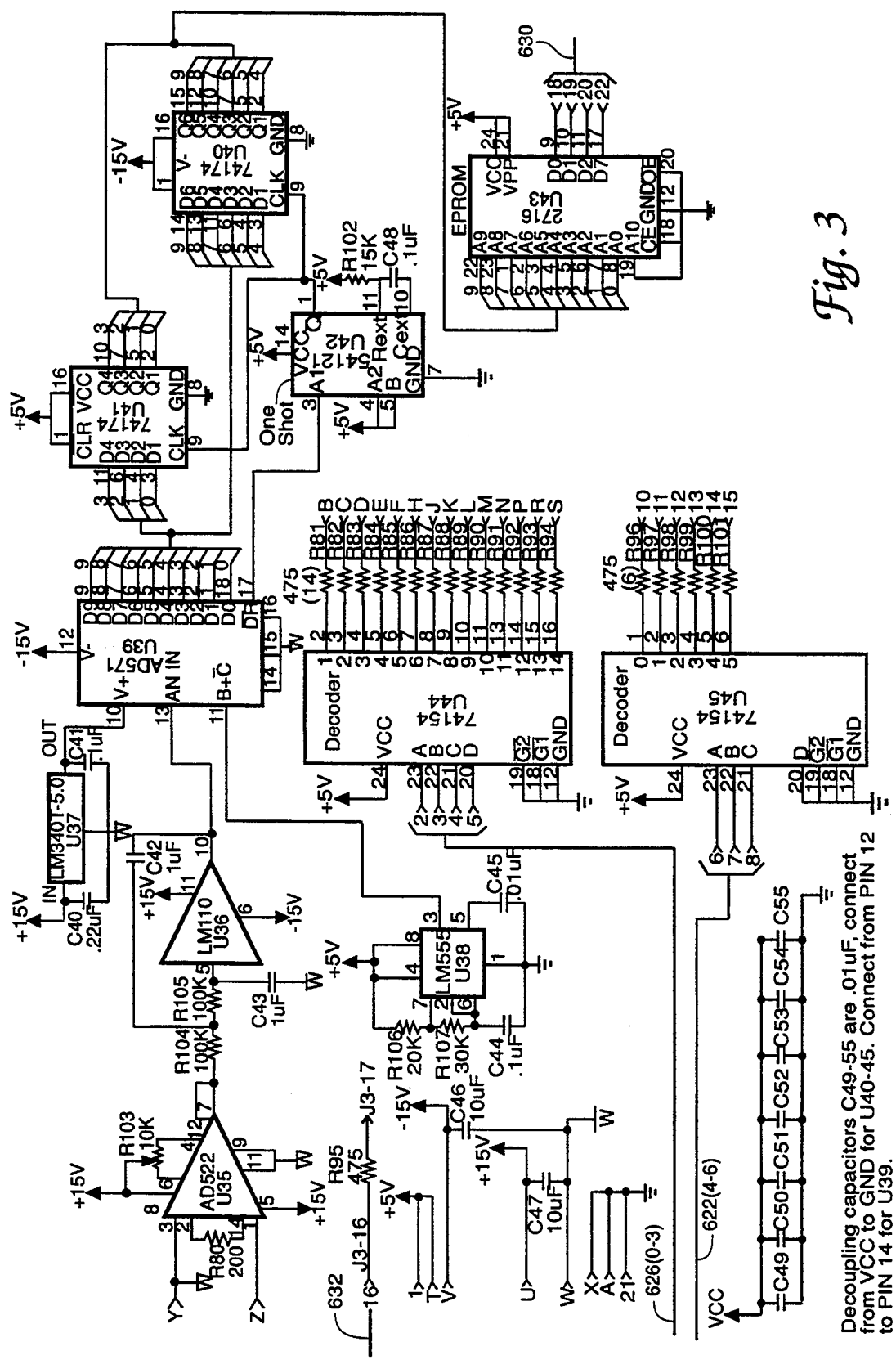
FIG. 3 is a schematic diagram of a LED driver and temperature ready card.
Figure 4:
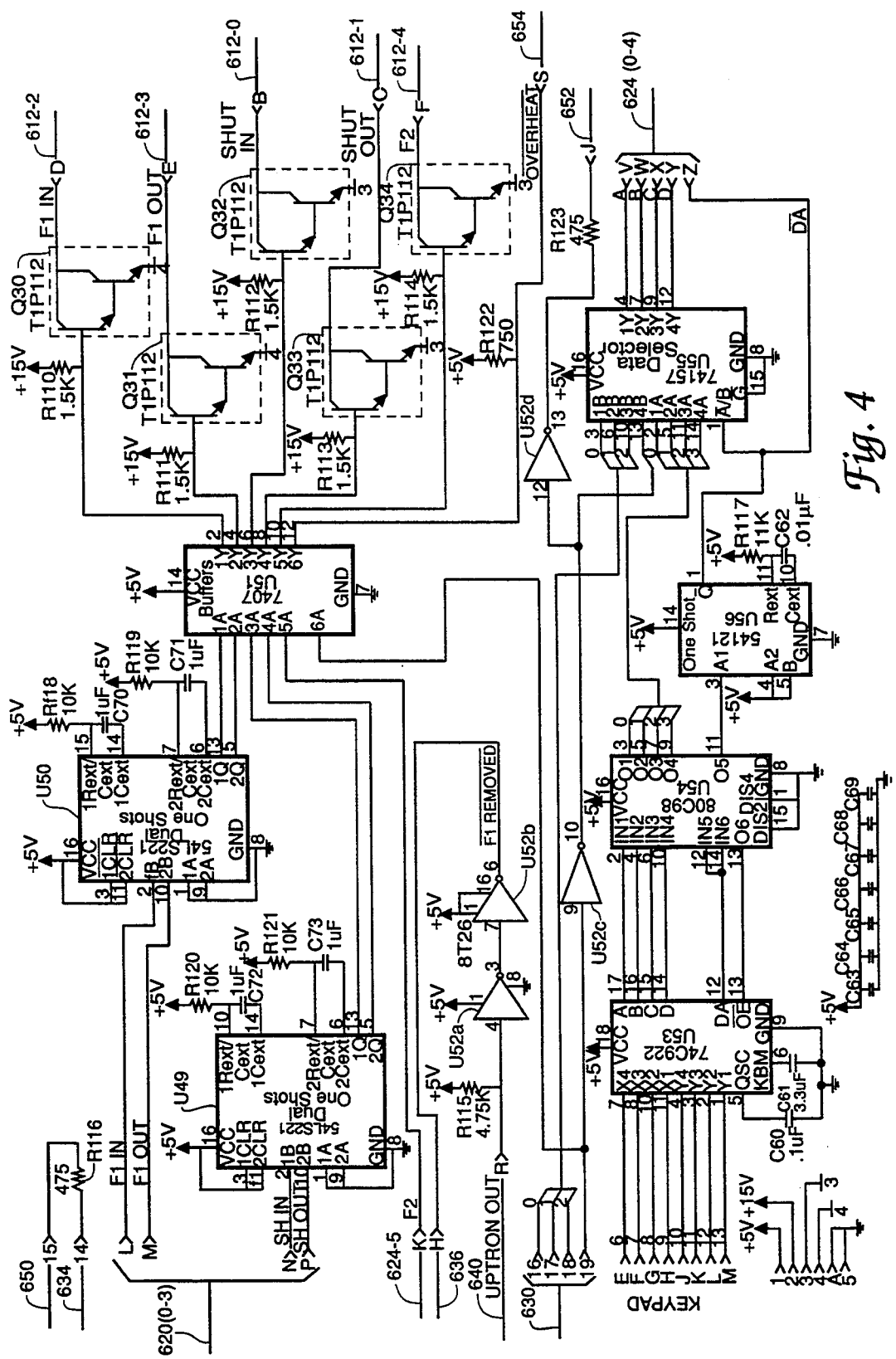
FIG. 4 is a schematic diagram of a shutter driver and keypad decoder card.
Figure 5:
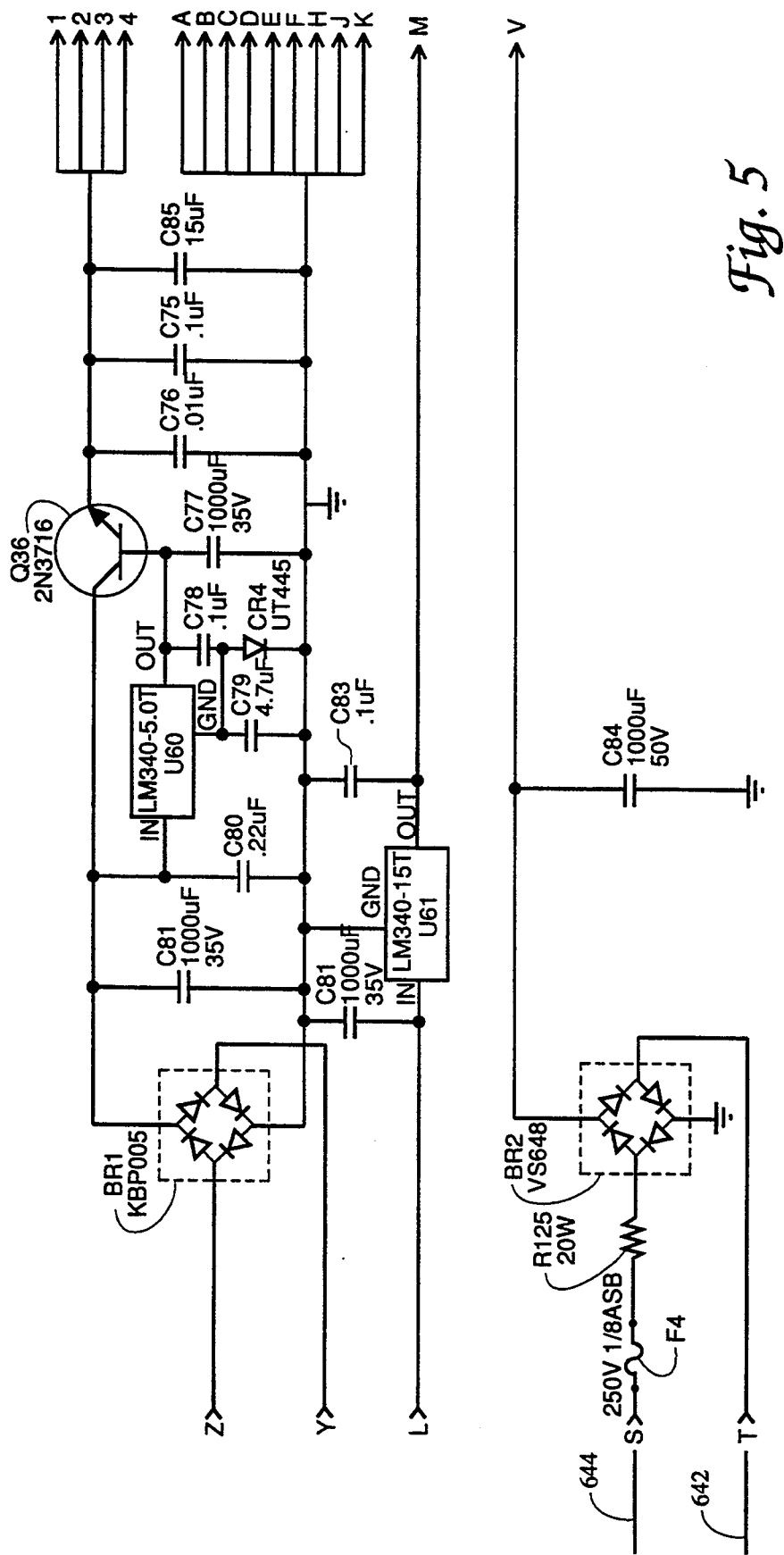
FIG. 5 is a schematic diagram of a power supply card.
Figure 6A:
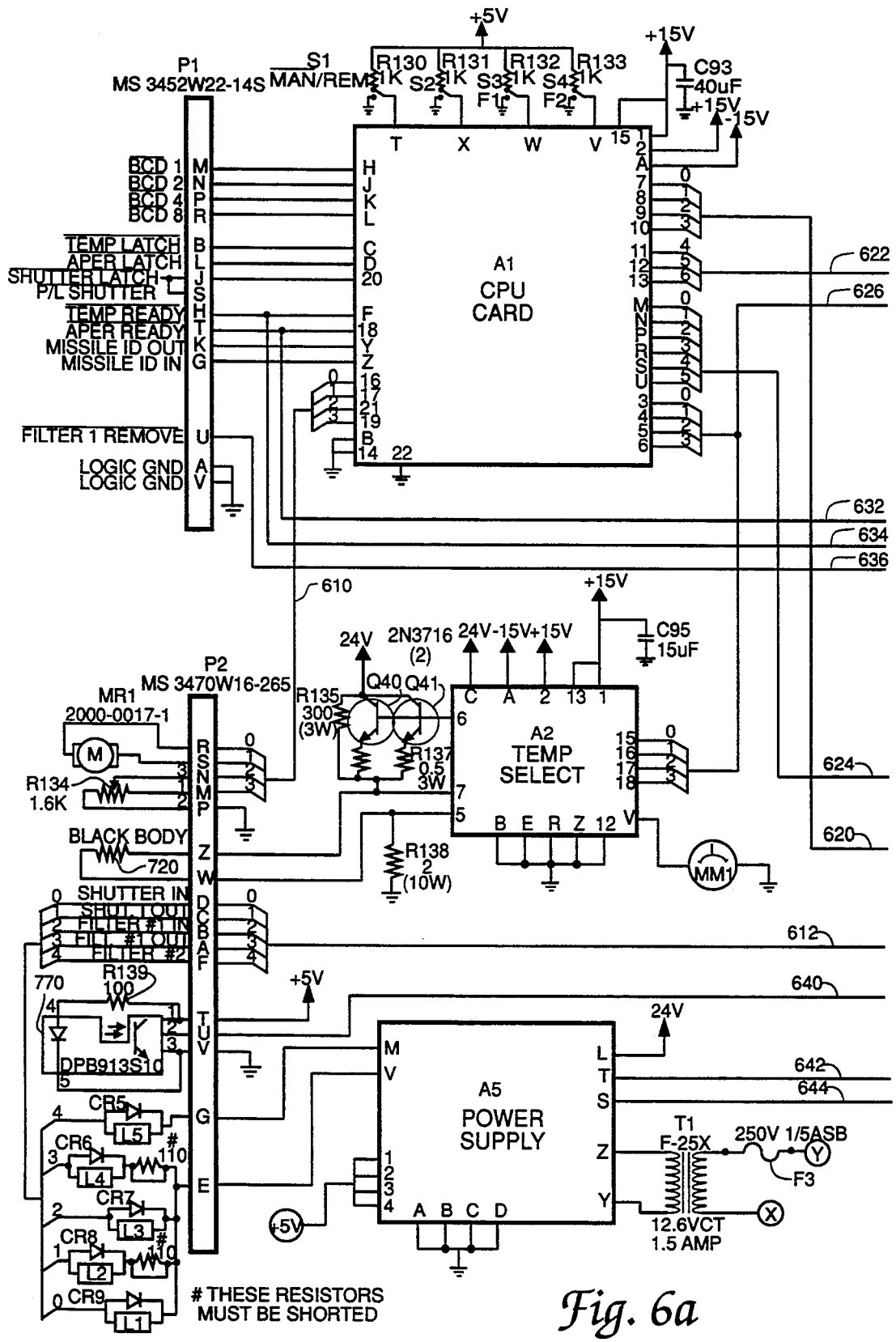
FIGS. 6a and 6b arranged as shown in FIG. 6 comprise a block and schematic diagram of a controller comprising an assembly of the cards of FIGS. 1-5 inclusive.
Figure 6B:
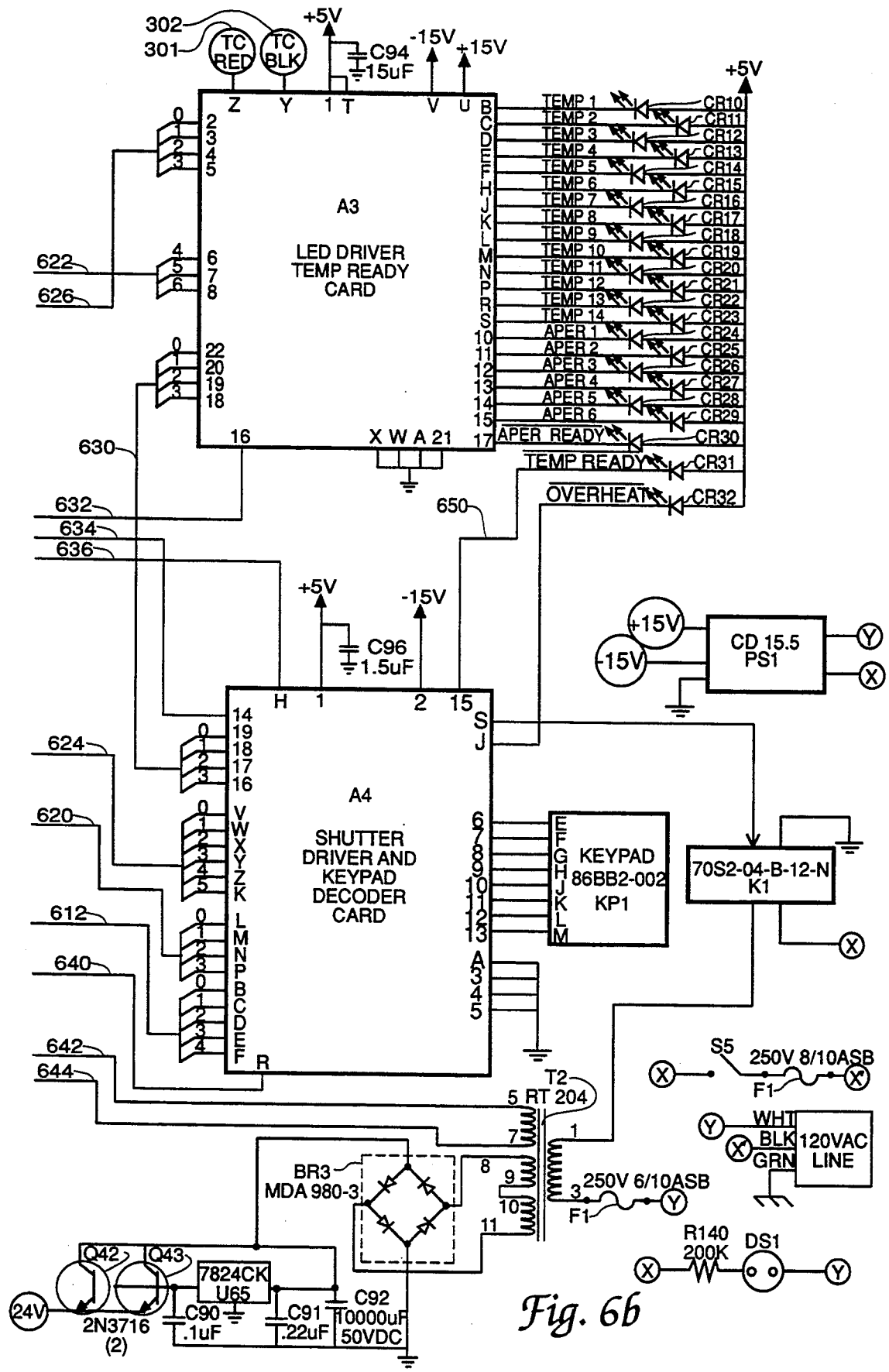

Referring to FIG. 7, the system includes the controller 600, and a rate table or stand 700. As shown in FIGS. 6a and 6b when arranged as shown in FIG. 6, the controller 600 comprises five printed circuit cards A1-A5 and some other circuits connected to the cards. A CPU card A1 is shown in FIGS. 1a and 1b, arranged as shown in FIG. 1; a temperature select card A2 is shown in FIG. 2; a LED driver and temperature ready card A3 is shown in FIG. 3; a shutter driver and keypad decoder card A4 is shown in FIG. 4; and a power supply card A5 is shown in FIG. 5. The controller 600 is coupled to the rate table 700 via two plugs P1 and P2. The apparatus shown to the left of plug P2 in FIG. 6a is part of the rate table, as shown in FIG. 7.

A missile Guidance and Control Section (GCS) 710 is mounted on the stand 700 for integration and acceptance testing. A black body has a heating resistor 720.

Between the black body 720 and the missile GCS 710, there are a shutter 740, a first filter 750, a second filter 760 and an aperture wheel 730, which together with the black body form the infrared heat source. The shutter 740 is controlled by two solenoids L1 and L2. The first filter 750 is controlled by two solenoids L3 and L4. The second filter 760 is controlled by one solenoid L5. The aperture wheel 730 is rotated by a motor M, and its position is detected by a potentiometer R134.

The Universal IR heat source is controlled by a microcomputer A1, shown in FIGS. 1a & 1b. The components that make up the microcomputer are a microprocessor U1, Input/Output ports U2, U3 and U9, an EPROM unit U4, and a decoder U5. Data goes in and out of the controller through the Input/Output ports U2, U3, and U9. The microprocessor U1 interprets the input data and sends it to circuitry to perform other functions in the controller. The EPROM U4 contains the program for the microprocessor. The assembly language program appears at the end of this specification, before the claims. The decoder U5 selects and deselects certain components in the system. There are ten 0.01 microfarad decoupling capacitors not shown in FIGS. 1a and 1b, which are connected from VCC to GND for devices U1-5, U7-9 and U13, and from pin 12 to 14 for device U6. There are four 0.01 microfarad decoupling capacitors not shown in FIG. 2, which are connected from VCC to GND for devices U20-24. There are seven 0.01 microfarad decoupling capacitors not shown in FIG. 3, which are connected from VCC to GND for devices U40-45, and from pin 12 to 14 for device U39. There are seven 0.01 microfarad decoupling capacitors not shown in FIG. 4, which are connected from VCC to GND for devices U49-51, and U53-U56.

The controller 600 has two modes of operation: manual and remote. In either mode the controller is capable of selecting any temperature, aperture and shutter filter combination. The remote mode is the most used. Three different kinds of data are read by the controller in digital code via pins M, N, P & R of plug P1: 1. Temperature data, 2. Aperture data, 3. Shutter-filter data. A fourth kind of data, Missile ID data, is read via pin G of plug P1. After data is read and decoded by the microprocessor U1, action is taken on each kind of data by separate circuitry.

Aperture Selection

The apertures are mounted in a large spur gear 730 that is called the aperture wheel. The apertures are placed in holes that are spaced equal distances apart near the edge of the wheel. A detent is used to hold the aperture wheel in each position. A d.c. motor M is used to turn the wheel. The position of the wheel is identified by the voltage at the wiper of a potentiometer R134. The pot R134 and aperture wheel 730 turn together. Each position on the wheel is equal to a voltage. The voltage is converted to a binary code that the microprocessor U1 can read. The microprocessor controls the power to the motor M. By the voltage at the pot R134, the microprocessor can tell which direction it needs to turn the motor and knows when to stop it.

Spur gears are attached to the shafts of the motor and pot R134. The aperture wheel is a gear also. All three gears mesh so that as the motor turns so does the aperture wheel and the shaft of pot R134. The output voltage at the wiper of R134 changes as the aperture motor turns. Each aperture position corresponds to a specific voltage at the wiper of R134. The signal from the wiper of the pot R134, via pin N of plug P2 and lead 2 of line 610, goes to terminal 21 of card A1, and in FIG. 1a the signal is fed into amplifier U11 which is a voltage follower. It is used to prevent loading of the pot voltage. The voltage from amplifier U11 is fed into the analog input at pin 13 of the A/D converter U6. Unit U10 is a square-wave oscillator whose output is coupled via an inverter U13f to clock inputs of the converter U6 and the flip-flop unit U7. Each time the output of inverter U13f goes high, the voltage from the output of amplifier U11 is converted by unit U6 to a binary number at five outputs D3-D7, and the data from the previous conversion is latched into five flip-flops of unit U7. Unit U7 stores the data for the microprocessor to conveniently read. The output from the flip-flops of unit U7 goes via line 138 to pins 10-14 (terminals PB0-4) of the I/O port unit U3.

Remote aperture selection is performed when the stand 700 sends aperture data to the controller and asserts the Aperture Latch line to a low logic level at pin L of plug P1. In FIG. 1b, the signal at terminal D of card A1 goes via lead 1 of line 150 to pin 39 (terminal CA2) of the I/O port U2. A low Aperture Latch line indicates to the microprocessor U1 that data needs to be read from the stand 700. The identity of the selected aperture is sent from the stand in digital form via pins M, N, P & R of plug P1 to terminals H, J, K & L of card A1, and in FIG. 1b to pins 6-9 (terminals PA4-7) of the I/O port U2. The microprocessor U1 reads the digital data from the stand and compares it with the data at terminals PB0-4 of I/0 unit U3 from the output pins of flip-flop unit U7. The result of the comparison tells the microprocessor which direction to turn the motor for the quickest positioning of the aperture selected.

The microprocessor U1 then sends motor data to the I/O port unit U3, which is transferred to pins 15 and 16 (terminals PB5 & 6) of unit U3. The data from unit U3 goes through filter networks that are used to eliminate false data on power-up. Once the data is through the filter networks, unit U14 acts a a noninverting high voltage buffer. A high logic level on either input of unit U14 is translated to approximately 13 volts and a low is translated to 0 volts at the outputs. Each half of unit U14 acts independently of the other. The outputs of unit U14 drive the transistors Q1, Q2, Q3, and Q4 which control the direction of the motor. Only one output from unit U14 can be high at a time. If pin 1 goes high and pin 7 goes low, power will be applied to the motor through transistor Q1. Transistor Q4 will turn on to supply a path to ground for current to flow. Transistors Q2 and Q3 will be off and the motor will turn. If pin 7 goes high and pin 1 goes low, transistors Q2 and Q3 will turn on and transistors Q1 and Q4 will turn off. Current will flow backwards through the motor and turn it in the other direction.

When the code from unit U7 is equal to the code that was sent to the controller by the stand, the microprocessor causes pins 15 and 16 of I/O unit U3 to go low which stops the aperture. The aperture wheel is held in the new position by the detent. To identify the aperture that is in place, the microprocessor sends out data on pins 10-12 of I/O port unit U2. From unit U2 the aperture data goes via line 146 to terminals 11, 12 & 13 of card A1, which as shown in FIGS. 6a & 6b are coupled via line 622 to terminals 6, 7 & 8 of card A3 to the decoder U45. Decoder U45 has six outputs coupled via 475-ohm resistors to terminals 10-15 of card A3, which as shown in FIG. 6b are coupled via leads APER1-6 to LEDs CR24-29. Decoder U45 decodes the aperture data and lights one of the LEDs that corresponds to the selected aperture position. An aperture ready signal is sent by the microprocessor from unit U3 pin 19 when the aperture wheel is in its new position. The aperture ready signal is sent via line 162 to a driver U8e which buffers the signal to terminal J1-18, so that it can be sent to the stand via pin T of plug P1, and also via a resistor R95 in FIG. 3 to light the aperture ready light CR30 (FIG. 6b) on the front of the controller.

Missile ID Data

Remote missile identification is performed by reading the logic level of the missile I.D. input line at pin G of plug P1, which goes via lead 7 of line 154 to the I/0 port unit U3 pin 9. The microprocessor determines the missile type and sends out the appropriate logic level at unit U9 pin 8 to satisfy the stand. The signal is coupled via a buffer U8c to the gate of transistor Q5. The missile ID out at the source of transistor Q5 goes to pin K of plug P1. If an 'L' or 'P' missile is on the rate table, the microprocessor will cause the source of Q5 to go to a logic high otherwise it will float.

Temperature Selection

The temperature selection card A2 and the circuits connected thereto as shown in FIG. 6a include a temperature control bridge. The bridge, which includes the black body 720, is shown by a simplified diagram in FIG. 2a, with a MOSFET Q10 represented as a switch and a transistor pair Q40-41 represented as a variable resistance. The black body 720 and resistor R138 which form one side of the bridge, along with the transistors Q40-Q41 and resistors R135 and R137 are shown in FIG. 6a; and resistors R25, R24, R26, R28 and R27 with MOSFET Q10 which form the other side of the bridge are shown in FIG. 2. An instrumentation amplifier U25 having inputs connected to the diagonal of the bridge is also shown in FIG. 2. Normally 24-volt power is supplied at the top of the bridge as shown in FIG. 2a via the 300-ohm, 3-watt resistor R135; but when the transistors Q40-Q41 are turned on, a high power level is supplied through the 0.5-ohm, 3-watt resistor R137.

Temperatures are selected by the microprocessor through a decoder U20 in FIG. 2. One of the decoder outputs will apply a voltage to a MOSFET. The MOSFET turns on to complete the bridge circuit. The differential voltage across the bridge is used to control the voltage level supplied to the bridge. By controlling the voltage to the bridge, the power dissipated by the black body is controlled. The more power the black body dissipates the hotter it gets and vice-versa. The resistance of the black body is related to its temperature. If the black body is too hot, a large differential voltage across the bridge will exist. The power supply to the bridge will be turned off by the control circuitry. When the black body cools enough to nearly balance the bridge, the power supply is turned back on. The power supply will only supply the voltage needed to keep the black body warm enough to balance the bridge. If the black body is too cool, the differential voltage across the bridge will cause the control circuitry to turn the power supply fully on until the bridge balances. The power supply voltage to the bridge is then cut back just enough to keep the bridge balanced. Remote temperature selection is performed when the stand 700 sends data via pins M, N, P & R of plug P1 to the controller 600, and asserts the Temperature Latch line at pin B of plug P1 to a logic low. The latch signal is forwarded via lead 0 of line 150 to pin 40 (terminal CA1) of the I/O port unit U2; and the temperature data is forwarded via pins M, N, P & R of plug P1 and terminals H, J, K & L of card A1 to pins 6-9 of the unit U2. The microprocessor reads the temperature data on pins 6-9 (terminals PA4-7) of unit U2 and converts it to a valid temperature code before sending it out on pins 2-5 (terminals PA0-3) of unit U2. A set of four inverters U13 inverts the data from unit U2 and sends it from terminals 3-6 of card A1, via line 626 and terminals 15-18 of card A2 to a decoder U20, and also via line 626 and terminals 2-5 of card A3 to a decoder U44. The fourteen outputs of decoder U44 are connected via 475-ohm resistors R81-R94 to LEDs CR10-23 in FIG. 6b. Decoder U44 decodes the temperature data and lights one of the LEDs that corresponds to the selected temperature. Decoder U20 decodes the same data but sends a logic high to an input of one of the high voltage buffers U22, U23, or U24 which applies 15 volts on the gate of a MOSFET.

Fourteen MOSFETs Q10-Q23 are used to select the temperatures for the different power levels. Each MOSFET has a different amount of resistance connected in series with it, with a 511-ohm resistor and a 100-ohm pot in series with MOSFET Q10 up to a 301-ohm resistor and a 20-ohm pot in series with MOSFET Q23. When one of the MOSFETs is turned on by a high voltage buffer, a voltage divider or one side of the bridge is completed by a pot and resistors which are connected in series with R26 and R24 to ground. For example, if the MOSFET Q10 is turned on, the pot R28 and resistor R27 are in series with resistors R26 and R24. The voltage that is set up by the voltage divider is used as a reference voltage. The voltage is applied to pin 1, which is the non-inverting input, of the instrumentation amplifier U25. A second voltage divider or the other side of the bridge is formed by the black body 720 and the 2-ohm, 10-watt resistor R138. The voltage from the second voltage divider is applied to pin 3 of amplifier U25 which is the inverting input.

The voltage at pin 3 of amplifier U25 is dependent on the temperature of the black body because it is the resistance temperature detector element. The hotter the black body is the greater will be the resistance and voltage drop across it. With a reference voltage applied to pin 1 of amplifier U25 and for example say the voltage on pin 3 of amplifier U25 is greater than the reference voltage, the black body will be too cool for the selected reference voltage of pin 1. With the inverting input more positive than the non-inverting input, the output of amplifier U25 will be at negative saturation. The output of amplifier U25 goes directly into the inverting input of amplifier U26 which is an op amp. Resistors R71 and R75 set up amplifier U26 with a gain of 10. Capacitor C26 is used to decrease the ac gain of amplifier U26. The output of amplifier U26 is coupled via a resistor R76 to the base of a transistor Q24, whose output via terminal 6 of card A2 goes to the base electrodes of transistors Q40 and Q41. With a negative voltage at the inverting input of amplifier U26, the output will be at positive saturation which turns on transistors Q24, Q40 and Q41. Resistor R77 is needed as a pull-down resistor when transistor Q24 is turned off. Transistors Q40 and Q41 are power pass transistors type 2N3716 for controlling power to the bridge. Once the pass transistors are biased on, a heavy current begins to flow through the black body and resistor R138 because of their low resistance values. A heavy current through the black body causes the black body to heat, therefor its resistance also increases. The voltage on pin 3 of amplifier U25 decreases as the resistance of the black body increases. The voltage at pin 3 decreases until it approaches the voltage at pin 1. The outputs of amplifiers U25 and U26 come out of saturation as the differential voltage between pins 1 and 3 continues to decrease.

The voltage to the bridge decreases as the bias on transistors Q24, Q40, and Q41 changes. The decrease in voltage to the bridge continues until the differential voltage across the inputs of amplifier U25 is stable and is approximately zero volts. In other words the resistance of the black body is stable and the bridge is balanced. When the voltage on pin 3 of amplifier U25 is more negative than the reference voltage on pin 1, the black body is too hot for the selected reference voltage. The output of amplifier U25 will go to positive saturation and amplifier U26 will saturate negative, turning off transistor Q24. The emitter of transistor Q24 is pulled low by resistor R77 which ensures that transistors Q40 and Q41 will be off also. The only source of power to the bridge is supplied by resistor R135. Limiting current to the bridge with resistor R135 allows the black body to cool and still lets amplifier U25 see the differential voltage across the bridge. As the differential voltage approaches zero volts, amplifier U25 comes out of positive saturation and U26 comes out of negative saturation. Transistors Q24, Q40, and Q41 are biased on as the output of amplifier U26 becomes positive. The cooling rate of the black body is slowed by an increase in voltage to the bridge, until the voltage to the bridge is stable and is approximately zero volts. In other words the black body resistance is stable and the bridge is balanced.

A meter MM1 (FIG. 6a) is used to indicate the output voltage of the amplifier U25. In FIG. 2, a voltage divider R72, R73 connected to the pin 7 of amplifier U25 provides an input to an amplifier U27, whose output is coupled via a resistor R18 and terminal V to the meter MM1.

The Temperature Ready signal is generated through the use of the thermocouple 301, 302 that is integrated into the black body. The thermocouple is shown in FIG. 6b connected to terminals Y and Z of the LED driver and temperature ready card A3. The thermocouple signal is fed into the instrumentation amplifier U35 on card A3. Because noise is introduced into the thermocouple leads by the missile, a Butterworth filter follows amplifier U35. The filter consists of amplifier U36, resistors R104 and R105, and capacitors C43 and C42. The signal from the output of amplifier U36 is a d.c. voltage which is converted to binary code by an A/D converter U39. The data from converter U39 is latched by flip-flops U40 and U41 to provide an address for the EPROM U43. The data from EPROM U43 tells the microprocessor whether the black body is heating, cooling, or stabilized. When the microprocessor determines that the black body temperature has stabilized, it causes pin 39 (terminal CA2) of I/O port unit U3 (FIG. 1b) to go low. Pin 8 of buffer U8d goes low, which via terminal F of card A1 and pin H of plug P1 tells the stand that the temperature is ready. The signal is also forwarded via line 634 to terminal 14 of card A4, a resistor R116 in FIG. 4 to terminal 15, and line 650 in FIG. 6b, lights the temperature ready LED CR31 on the front of the controller box.

Part of the temperature ready system is the black body protection circuitry. The black body is completely protected from overheating due to critical component failure or miscalibration. When the black body 720 reaches approximately 905 degrees C pin 17 of EPROM U43 in FIG. 3 goes low. The signal goes via terminal 22 of card A3 and a lead of line 630, to terminal 19 of card A4. In FIG. 4 the signal goes via a buffer of unit U51 to terminal S, and also via inverters U52c and U52d and a resistor R123 to terminal J. (The inverters U52a, U52b, U52c & U52d comprise a type 8T26 chip.) Resistor R123 is a current limiting resistor for the overheat light CR32. In FIG. 6b, the signal from terminal J of card A4 turns on the overheat light when the black body gets too hot. Unit U51 is a set of open collector buffers, and the signal via terminal S normally applies a high logic level to the input of the solid state relay K1, to turn it on.

Relay K1 will be in the on state to supply a.c. power to transformer T2 when the temperature of the black body is under 905 degrees. The connection from terminal X' of the 120-volt AC line goes via fuse F1 and switch S5 to terminal X, thence via relay K1, the primary winding of transformer T2 and fuse F2 to terminal Y of the 120 volt line. A neon lamp DS1 indicates power on.

Transformer T2 supplies power for the 24-volt power supply from a secondary winding and a rectifier bridge BR3; and a voltage regulator comprising an IC unit U65, capacitors C90, C91 and C92, and transistors Q42 and Q43. When the black body goes over 905 degrees, pin 17 of the EPROM U43 in FIG. 3 goes to a low logic level. The output of buffer U51 pin 12 now goes low and relay K1 turns off. With no a.c. to transformer T2 the 24 volt power supply is turned off. The black body cools below 905 degrees so pin 17 of EPROM U34 changes to a high logic level again. Buffer U51 turns relay K1 back on and the 24 volt power supply turns back on. The results of testing this circuit shows that the fuse for the 24-volt supply will blow or the black body temperature will be maintained at approximately 905 degrees.

Shutter-Filter Selection

Referring to FIG. 7, the shutter and filters are moved between the apertures and the black body by solenoids. The shutter 740 is a long, narrow steel plate that slides in front of the black body. The #1 Filter 750 is set up the same as the shutter except a filter is bonded to the end of the plate. It is necessary to move the shutter and #1 filter very quickly. With a high voltage applied to a linear solenoid it will energize quickly enough to meet the time requirements for the shutter and #1 filter. Mechanical locking devices are used to hold the shutter and #1 filter in their individual places. Springs return the shutter and #1 filter when they are unlocked. The solenoid for #2 filter must be energized to hold the filter in. Cutting the power causes the #2 filter to remove itself.

Remote shutter and filter selection for an 'M' missile is performed when the stand 700 sends remote data to the controller 600 via pins M, N, P & R of plug P1 to terminals H, J, K & L of card A1, and causes the shutter latch line via pin J of plug P1 to terminal 20 of card A1 to go low. The microprocessor (FIG. 1) receives the shutter latch signal at pin 18 (terminal CB1) of the I/0 port U2, and reads the data on pins 6–9 (terminals PA4–7). The data to move the shutter or filters is sent out on pins 13-17 (terminals PB3-7) of port U2, and forwarded from terminal U via lead 5 of line 624, and the four leads 0-3 of line 620 to terminals K, L, M, N & P of card A4. The data is received by units U49 and U50 which are dual one-shots. One shot unit U50 receives the data to move the #1 filter 750 in and out at pins 2 and 10 respectively (terminals 1B and 2B), and one shot unit U49 receives the data to move the shutter 740 in and out at pins 2 and 10 respectively (terminals 1B and 2B). Data at terminal K for the #2 filter 760 goes directly into buffer unit U51 which is a high voltage buffer. All the one-shots are set up to give an output pulse about 7 milliseconds long when the inputs go high. The one-shot outputs go into the high voltage buffer along with #2 filter data. The buffer is used to apply 15 volts to the base of the darlington transistors Q30-Q34 that are to be selected. The 15 volts causes the transistors to saturate and provide a current path to ground. Output from the transistors Q30-Q34 is sent via line 612 to pins D, C, B, A & F of plug P2. Solenoids L1-L5 are used to move the shutter and filters in and out of position.

Power at 40 volts from terminal V of the power supply card A5 via pin E of plug P2 is applied to solenoids L1-L4 to move the shutter 740 and #1 filter 750 in and out at high speeds. Power at 15 volts from terminal M of the power supply card A5 via pin G of plug P2 is applied to solenoid L5 for the #2 filter 760 since speed is not critical. For the 40-volt supply, a secondary winding of transformer T2 in FIG. 6a is coupled via lines 644 and 42 to terminals S and T of card A5, and in FIG. 5 is coupled via a fuse F4 and a resistor R125 to a rectifier bridge BR2. The dc output from the bridge BR2 is filtered by a shunt capacitor C84 and supplied to terminal V. For the 15-volt supply, 24 volts at terminal L is coupled via an IC unit U61 to terminal M. The power supply card A5 also includes a 5-volt power source having ac input at terminals Z and Y from a transformer T1, whose primary is connected from terminal X via a fuse F3 to terminal Y from the 120-volt ac line in FIG. 6b. The 5-volt supply in FIG. 5 comprises a rectifier bridge BR1, capacitors C75-C85, an IC unit U60, and a transistor Q36.

When one of the five solenoid-actuating transistors Q30-Q34 is selected and saturates, current passes through the solenoid coupled thereto and causes it to move. The shutter 740 and #1 filter 750 use two solenoids each. One solenoid is for the in position and the other for the out position. A locking system keeps the solenoids L1 and LB in the in position without having to maintain power on the solenoids. The pulses from the one-shots are set up to be high long enough to move the solenoids into the locked position before going low again. To move the shutter or filter back out, the locking solenoid is simply unlocked and a spring returns the shutter or filter to the out position. The solenoid L5 for the #2 Filter 760 needs a constant high signal to keep the filter in and a constant low signal to keep it out.

A #1 filter removed signal is generated by a gap detector 770 (located in the heat source) with an open collector output. The detector 770 is connected to pins T, U and V of plug P2. Power at +5 volts is supplied via pin T to pin 1 of detector 770, and also via a resistor R139 to pin 4. Pins 3 and 5 of the detector are connected via pin v of the plug to ground. Output pin 2 of the detector is coupled via pin U of the plug and line 640 to terminal R of the card A4. When the #1 filter moves out, a shutter is removed from the gap of the detector and its output goes low. Resistor R115 (FIG. 4) is the pull-up resistor for the output. The signal is buffered via inverters U52a and U52b and sent back via terminal H of card A4, line 636 and pin U of plug P1 to the stand to be processed.

Remote shutter selection for 'L' and 'P' missiles is done by reading the logic level of the shutter latch line on pin 9 of I/0 port U9. A high logic level on the shutter latch line calls for the shutter to go in. A low calls for the shutter to go out. The shutter is moved by the method described for the 'M' missile.

Manual selection of power levels is done by the keypad that is mounted on the front panel of the controller. When the manual-remote switch S1 connected to terminal T of card A1 is flipped up, the controller will respond only to the keypad KP1 and switches on the front of the controller. The signal at terminal T (FIG. 6b) goes to pin 17 (terminal PB7) of the I/0 port U3. Each key is defined as a power level. When a key is pressed unit U53 decodes the keypress and sends the binary code to a buffer U54 that interfaces CMOS with TTL. The data is sent to units U55 and U56. The one shot U56 has a dual function. First the signal goes to terminal Z to tell the microprocessor that there is data to be read from the keypad. Second it tells the data selector U55 which set of data lines to transfer its outputs which are connected to terminals V, W, X & Y. The signal from terminal Z is sent via line 624 lead 4 to card A1 terminal S, and then to pin 6 of the microprocessor U1 (FIG. 1a). The data signals are sent via line 624 leads 0-3 to card A1 terminals M, N, P & R. The microprocessor reads the data through I/O port U3 pins 2-5 (terminals PA0-3) and determines which key was pressed. Aperture and temperature data is generated by the microprocessor and sent to the same circuitry that was used in the remote mode.

Manual selection of the shutter and filters is done by flipping the switches (FIG. 6a) on the front of the controller when it is in manual. Switch S2 for the shutter, Switch S3 for the #1 filter and switch S4 for the #2 filter are connected to terminals X, W & V respectively of card A1. In FIG. 1b, the microprocessor reads the logic level on the switches through I/O port U3 pins 6-8 (terminals PA4-6). When a switch is flipped the microprocessor generates the data and sends it to the same circuitry that is used in the remote mode.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

```
            PROGRAM - M6800 Assembler version A.01

0005                   NAM     NOEOI
   0010 0000              ORG     $0
   0015 0000      CAL     RMB     1          CALIBRATION INDICATOR
```

```
0020 0001            SHIND   RMB     1       SHUTTER INDICATOR
0025 0002            TCOUNT  RMB     1       COUNT TIMES THE DATA IS STABLE
0030 0003            COOL    RMB     1       COUNT DATA CHANGES
0035 0004            HEAT    RMB     1       COUNT DATA CHANGES
0040 0005            LOOK    RMB     1       SEE IF TEMP IS STABLE
0045 0006            MANAP   RMB     1       MANUAL APERTURE DATA
0050 0007            REMAP   RMB     1       REMOTE APERTURE DATA
0055 0008            STOP    RMB     1       MOTOR INDICATOR
0060 0009            SHUTT   RMB     1       SHUTTER DATA
0065      2001       PIA1AC  EQU     $2001
0070      2003       PIA1BC  EQU     $2003
0075      2000       PIA1AD  EQU     $2000   TEMP SELECT, LIGHTS
0080      2002       PIA1BD  EQU     $2002   APER LIGHTS,SHUTTER,FILTER DATA
0085      4001       PIA2AC  EQU     $4001
0090      4003       PIA2BC  EQU     $4003
0095      4000       PIA2AD  EQU     $4000   KEYPAD,SHUT,FILT,MISSILE ID INPUTS
0100      4002       PIA2BD  EQU     $4002   A/D DATA,MOTOR OUT,MAN/REM INPUT
0105      6001       PIA3AC  EQU     $6001
0110      6003       PIA3BC  EQU     $6003
0115      6000       PIA3AD  EQU     $6000   MISSILE ID OUTPUT,P/L SHUTTER INPUT
0120      6002       PIA3BD  EQU     $6002   UNUSED
0125 F800            ORG     $F800
0130 F800 0F         INIT    SEI             MASK INTERRUPTS
0135 F801 8E 007F            LDS     #$7F
0140 F804 CE 007F            LDX     #$7F
0145 F807 86 AA      LOAD    LDA A   #$AA    CHECK THE RAM
0150 F809 A7 00              STA A   ,X
0155 F80B E6 00              LDA B   ,X
0160 F80D 11                 CBA
0165 F80E 26 16              BNE     ERROR
0170 F810 09                 DEX
0175 F811 27 02              BEQ     AGAIN
0180 F813 20 F2              BRA     LOAD
0185 F815 CE 007F  AGAIN     LDX     #$7F
0190 F818 86 55    LOAD1     LDA A   #$55
0195 F81A A7 00              STA A   ,X
0200 F81C E6 00              LDA B   ,X
0205 F81E 11                 CBA
0210 F81F 26 05              BNE     ERROR
0215 F821 09                 DEX
0220 F822 27 05              BEQ     SETIO
0225 F824 20 F2              BRA     LOAD1
0230 F826 01       ERROR     NOP
0235 F827 20 FD              BRA     ERROR
0240 F829 4F       SETIO     CLR A
0245 F82A B7 2001            STA A   PIA1AC  ACCESS DATA DIRECTION REGISTERS
0250 F82D B7 2003            STA A   PIA1BC
0255 F830 B7 4001            STA A   PIA2AC
0260 F833 B7 4003            STA A   PIA2BC
0265 F836 B7 6001            STA A   PIA3AC
0270 F839 B7 6003            STA A   PIA3BC
0275 F83C B7 4000            STA A   PIA2AD  MAKE PA0-7 INPUT PORTS
0280 F83F 97 00              STA A   CAL     CLEAR CALIBRATION INDICATOR
0285 F841 97 02              STA A   TCOUNT  CLEAR TEMPERATURE COUNT
0290 F843 97 04              STA A   HEAT
0295 F845 97 03              STA A   COOL
0300 F847 97 05              STA A   LOOK
0305 F849 97 01              STA A   SHIND
0310 F84B 86 7F              LDA A   #$7F
0315 F84D B7 6000            STA A   PIA3AD  PA7 INPUT,OTHERS OUTPUTS
0320 F850 86 01              LDA A   #$01
0325 F852 97 06              STA A   MANAP   INITIALIZE WITH APER DATA
0330 F854 97 07              STA A   REMAP
0335 F856 86 0F              LDA A   #$0F
0340 F858 B7 2000            STA A   PIA1AD  PA0-3 OUTPUTS,PA4-7 INPUTS
0345 F85B 86 FF              LDA A   #$FF
0350 F85D B7 2002            STA A   PIA1BD  PB0-7 OUTPUTS
0355 F860 B7 6002            STA A   PIA3BD  PB0-7 OUTPUTS
0360 F863 87 60              LDA A   #$60
0365 F865 B7 4002            STA A   PIA2BD  PB5,PB6 OUTPUTS,OTHERS INPUTS
```

```
0370 F868 86 04           LDA A   #$4        (4=DISABLE)(D=ENABLE)
0375 F86A B7 2001          STA A   PIA1AC     CA1,CA2 HIGH TO LOW
0380 F86D 86 3C            LDA A   #$3C
0385 F86F B7 4001          STA A   PIA2AC     3C=DIS CA1,TMP RDY OFF,34=TMP RDY ON
0390 F872 B7 4003          STA A   PIA2BC     3C=DIS CB1,AP RDY OFF,34=AP RDY ON
0395 F875 86 35            LDA A   #$35
0400 F877 B7 2003          STA A   PIA1BC     34=DIS CB1,CB2 OUTPUT,35=CB1 H TO L
0405 F87A B7 6001          STA A   PIA3AC     DISABLE CA1
0410 F87D B7 6003          STA A   PIA3BC     DISABLE CB1
0415 F880 86 0E            LDA A   #$0E       INITIALIZE TEMP,APER,SHUT,FILTERS
0420 F882 B7 2000          STA A   PIA1AD     OUTPUT DATA FOR TEMP 1
0425 F885 86 A1            LDA A   #$A1
0430 F887 B7 2002          STA A   PIA1BD     OUTPUT DATA FOR AP1,SHUT,FILT OUT
0435 F88A 7E FA4F          JMP     MANUAL
0440 F88D B6 2001   IRQ    LDA A   PIA1AC     CHECK LATCH INTERRUPTS
0445 F890 2B 17            BMI     TLAT
0450 F892 48 17            ASL A
0455 F893 2B 17            BMI     ALAT
0460 F895 B6 4000          LDA A   PIA2AD     READ MISSILE ID LINE
0465 F898 2B 02            BMI     LMISSL
0470 F89A 20 07            BRA     MMISS
0475 F89C C6 40   LMISSL   LDA B   #$40       SET MISSILE ID LINE
0480 F89E F7 6000          STA B   PIA3AD     FOR 'L' OR'P' MISSILES
0485 F8A1 20 0F            BRA A   NOFILT2
0490 F8A3 5F      MMISSL   CLR B              CLEAR MISSILE ID LINE
0495 F8A4 F7 6000          STA B   PIA3AD     FOR 'M' MISSILES
0500 F8A7 20 06            BRA     SLAT
0505 F8A9 7E F91F TLAT     JMP     TLATCH
0510 F8AC 7E F97D ALAT     JMP     ALATCH
0515 F8AF 7E F9B1 SLAT     JMP     SLATCH
0520 F8B2 B6 2002 NOFILT   LDA A   PIA1BD     CLEAR INTERRUPT AND RETURN
0525 F8B5 3B               RTI
0530 F8B6 F6 4000 CALIT    LDA B   PIA2AD     READ THE KEYBOARD
0535 F8B9 C4 0F            AND B   #$0F
0540 F8BB C0 01            SUB B   #$1
0545 F8BD F7 2000          STA B   PIA1AD     OUTPUT TEMPERATURE DATA
0550 F8C0 86 3C            LDA A   #$3C
0555 F8C2 F7 4001          STA A   PIA2AC     TEMP READY LIGHT OFF
0560 F8C5 F6 FFF7          LDA B   ALLOUT     APER 0;SHUT,FILTERS OUT
0565 F8C8 F7 2002          STA B   PIA1BD     OUTPUT DATA
0570 F8CB 5F               CLR B
0575 F8CC D7 06            STA A   MANAP      STORE APERATURE DATA
0580 F8CE BD FAF4          JSR     APDATA
0585 F8D1 7F 0002          CLR     TCOUNT
0590 F8D4 7F 0000          CLR     CAL
0595 F8D7 3B               RTI
0600 F8D8 86 50   KEYE     LDA A   #$50
0605 F8DA 97 00            STA A   CAL
0610 F8DC 3B               RTI
0615 F8DD 01 50   KEYF     NOP
0620 F8DE F6 4000 NMI      LDA B   PIA2AD     READ KEYBOARD DATA
0625 F8E1 C4 0F            AND B   #$0F
0630 F8E3 C1 01            CMP B   #$01       CHECK FOR E KEYPRESS
0635 F8E5 27 F1            BEQ     KEYE
0640 F8E7 96 00            LDA A   CAL        CHECK CALIBRATION INDICATOR
0645 F8E9 26 CB            BNE     CALIT
0650 F8EB 86 3C            LDA A   #$3C
0655 F8ED B7 4001          STA A   PIA2AC     TEMP RDY LIGHT OFF
0660 F8F0 7F 0002          CLR     TCOUNT
0665 F8F3 7F 0003          CLR     COOL
0670 F8F6 7F 0004          CLR     HEAT
0675 F8F9 CE FFD4          LDX     #$FFD4     TOP OF TEMP DATA TABLE
0680 F8FC 86 0F            LDA     #$0F       LOAD CODE FOR 0 KEYPRESS
0685 F8FE 11      HUNT     CBA                COMPARE ACC A WITH KEYBOARD DATA
0690 F8FF 27 05            BEQ     TOAD       IF EQUAL,OUTPUT TEMP,APER DATA
0695 F801 4A               DEC A
0700 F902 08               INX
0705 F903 08               INX
0710 F904 20 F8            BRA     HUNT
0715 F906 F6 2002 TOAD     LDA B   PIA1BD     READ SHUTTER DATA
```

```
0720 F909 C4 F8              AND B  #$F8
0725 F90B D7 09               STA B  SHUTT     SAVE DATA
0730 F90D A6 00               LDA A  ,X
0735 F90F B7 2000             STA A  PIA1AD    OUTPUT TEMP DATA
0740 F912 A6 01               LDA B  1,X
0745 F914 97 06               STA A  MANAP     SAVE MANUAL APER DATA
0750 F916 9A 09               ORA A  SHUTT
0755 F918 B7 2002             STA A  PIA1BD    OUTPUT APER,SHUT DATA
0760 F91B BD FAF4             JSR    APDATA
0765 F91E 3B                  RTI
0770 F91F 8D 53      TLATCH   BSR    TIMERS
0775 F921 86 3C               LDA A  #$3C      TEMP READY LIGHT OFF
0780 F923 B7 4001             STA A  PIA2AC
0785 F926 7F 0002             CLR    TCOUNT
0790 F929 7F 0003             CLR    COOL
0795 F92C 7F 0004             CLR    HEAT
0800 F92F B6 2000             LDA A  PIA1AD    READ REMOTE DATA,CLEAR INTERRUPT
0805 F932 44                  LSR A
0810 F933 44                  LSR A
0815 F934 44                  LSR A
0820 F935 44                  LSR A
0825 F936 81 05               CMP A  #$05      CHECK FOR INVALID CODE
0830 F938 23 39               BLS    GETLOS    IF INVALID RETURN FROM INTERRUPT
0835 F93A F6 4000             LDA B  PIA2AD    CHECK MISSILE ID LINE
0840 F93D 2B 02               BMI    PTEMP
0845 F93F 20 2B               BRA    MTEMP
0850 F941 81 0B      PTEMP    CMP A  #$0B
0855 F943 22 09               BHI    LTEMP
0860 F945 81 07               CMP A  #$07
0865 F947 23 2A               BLS    GETLOS
0870 F949 8B 02               ADD A  #$02      ITS A 'P'
0875 F94B 43                  COM A
0880 F94C 20 22               BRA    YES
0885 F94E 81 0C      LTEMP    CMP A  #$0C
0890 F950 27 0A               BEQ    LCODE1
0895 F952 81 0D               CMP A  #$0D
0900 F954 27 0A               BEQ    LCODE2
0905 F956 81 0E               CMP A  #$0E
0910 F958 27 0A               BEQ    LCODE3
0915 F95A 20 0C               BRA    LCODE4
0920 F95C 86 0B      LCODE1   LDA A  #$0B
0925 F95E 20 10               BRA    YES
0930 F960 86 0C      LCODE2   LDA A  #$0C
0935 F962 20 0C               BRA    YES
0940 F964 86 0A      LCODE3   LDA A  #$0A
0945 F966 20 08               BRA    YES
0950 F968 86 09      LCODE4   LDA A  #$09
0955 F96A 20 04               BRA    YES
0960 F96C 81 0F      MTEMP    CMP A  #$0F
0965 F96E 27 03               BEQ    GETLOS
0970 F970 B7 2000   YES       STA A  PIA1AD    OUTPUT TEMP DATA
0975 F973 3B        GETLOS    RTI
0980 F974 86 06     TIMERS    LDA A  #$06      RELAY TIMING ROUTINE
0985 F976 BD FB2F   BOUNCE    JSR    TIME
0990 F979 4A                  DEC A
0995 F97A 26 FA               BNE    BOUNCE
1000 F97C 39                  RTS
1005 F97D 8D F5     ALATCH    BSR    TIMERS    LET RELAYS SETTLE
1010 F97F F6 2000             LDA B  PIA1AD    READ REMOTE DATA,CLEAR INTERRUPT
1015 F982 53                  COM B
1020 F983 54                  LSR B
1025 F984 54                  LSR B
1030 F985 54                  LSR B
1035 F986 54                  LSR B
1040 F987 C1 07               CMP B  #$07      CHECK FOR PL4 APERTURE DATA
1045 F989 27 14               BEQ    YESPL4    SKIP IF NOT FOR PL4
1050 F98B C1 67               CMP B  #$06      CHECK FOR PL4CAL
1055 F98D 27 19               BEQ    PL4CAL    SKIP IF NOT FOR PL4CAL
1060 F98F D7 07     OUTAP     STA B  REMAP     SAVE REMOTE APER DATA
1065 F991 B6 2002             LDA B  PIA1BD    READ SHUT,FILTER DATA
```

```
1070 F994 84 F8           AND A    #$F8
1075 F996 9A 07            ORA A    REMAP
1080 F998 B7 2002          STA A    PIA1BD    OUTPUT APER,SHUT,FILTER DATA
1085 F99B BD F9EE          JSR      RADATA
1090 F99E 3B               RTI
1095 F99F 86 01   YESPL4   LDA A    #$01      LOAD CODE FOR PL3X
1100 F9A1 B7 2000          STA A    PIA1AD    OUTPUT TEMP DATA
1105 F9A4 C6 05            LDA B    #$05      LOAD PL3X APER DATA
1110 F9A6 20 E7            BRA      OUTAP
1115 F9A8 86 04   PL4CAL   LDA A    #$04      LOAD CODE FOR PL3
1120 F9AA B7 2000          STA A    PIA1AD    OUTPUT TEMP DATA
1125 F9AD C6 05            LDA B    #$05      LOAD PL3 APER DATA
1130 F9AF 20 DE            BRA      OUTAP
1135 F9B1 B6 2000 SLATCH   LDA A    PIA1AD    READ REMOTE DATA
1140 F9B4 44               LSR A
1145 F9B5 44               LSR A
1150 F9B6 44               LSR A
1155 F9B7 44               LSR A
1160 F9B8 CE FFCC          LDX      #$FFCC    TOP OF REMOTE SHUTTER
1165 F9BB C6 0F            LDA B    #$0F      FILTER DATA TABLE
1170 F9BD 11      FINDIT   CBA
1175 F9BE 27               BEQ      FROG
1180 F9C0 5A               DEC B
1185 F9C1 08               INX
1190 F9C2 20 F9            BRA      FINDIT
1195 F9C4 A6 00   FROG     LDA A
1200 F9C6 9A 07            ORA A    REMAP
1205 F9C8 B7 2002          STA A    PIA1BD    OUTPUT SHUT,FILTER,APER DATA
1210 F9CB 8D A7            BSR      TIMERS
1215 F9CD B6 2002          LDA A    PIA1BD
1220 F9D0 3B               RTI
1225 F9D1 F6 4000 SHUTLP   LDA B    PIA2AD    CHECK MISSILE IDLINE
1230 F9D4 2B 01            BMI      CKPLSL
1235 F9D6 39               RTS
1240 F9D7 F6 6000 CKPLSL   LDA B    PIA3AD    ITS AN 'L' OR 'P'
1245 F9DA 2B 09            BMI      PLSHIN
1250 F9DC D6 07            LDA B    REMAP     SHUTTER LINE WAS LOW KEEP
1255 F9DE FA FFF7          ORA B    ALLOUT    SHUTTER OUT
1260 F9E1 F7 2002          STA B    PIA1BD    OUTPUT APER,SHUT,FILTER DATA
1265 F9E4 39               RTS
1270 F9E5 D6 07   PLSHIN   LDA B    REMAP     SHUTTER LINE WAS HIGH PULL
1275 F9E7 FA FFF3          ORA B    SHIN      SHUTTER IN
1280 F9EA F7 2002          STA B    PIA1BD    OUTPUT APER,SHUT,FILTER DATA
1285 F9ED 39               RTS
1290 F9EE 86 40   RADATA   LDA A    #$40
1295 F9F0 97 08            STA A    STOP
1300 F9F2 B6 4002 RADATA   LDA A    PIA2BD    READ A/D DATA
1305 F9F5 84 1F            AND A    #$1F
1310 F9F7 D6 07            LDA B    REMAP     LOAD REMOTE APERTURE DATA
1315 F9F9 58               ASL B
1320 F9FA 58               ASL B
1325 F9FB CA 01            ORA B    #$01      SET RESOLUTION BIT
1330 F9FD 11               CBA
1335 F9FE 27 15            BEQ      ROK
1340 FA00 86 3C            LDA A    #$3C
1345 FA02 B7 4003          STA A    PIA2BC    TURN APER READY LIGHT OFF
1350 FA05 22 07            BMI      RCCWIS
1355 FA07 86 20   RCWISE   LDA A    #$20
1360 FA09 B7 4002          STA A    PIA2BD    TURN MOTOR
1365 FA0C 20 E4            BRA      RDATA
1370 FA0E 86 40   RCCWIS   LDA A    #$40
1375 FA10 B7 4002          STA A    PIA2BD    TURN MOTOR
1380 FA13 20 DD            BRA      RDATA
1385 FA15 86 00   ROK      LDA A    #$0
1390 FA17 B7 4002          STA A    PIA2BD
1395 FA1A BD F9D1          JSR      SHUTLP
1400 FA1D BD FB2F          JSR      TIME
1405 FA20 7A F0000         DEC      STOP
1410 FA23 26 CD            BNE      RDATA
1415 FA25 86 34            LDA      #$34
```

| | | | | | | |
|---|---|---|---|---|---|---|
| 1420 | FA27 | B7 4003 | | STA A | PIA2BC | LIGHT APERTURE READY LIGHT |
| 1425 | FA2A | 39 | OUTNOW | RTS | | |
| 1430 | FA2B | 96 01 | SHUTSW | LDA A | SHIND | READ THE INDICATOR |
| 1435 | FA2D | F6 4000 | | LDA B | PIA2AD | READ THE SWITCHES |
| 1440 | FA30 | C4 70 | | AND B | #$70 | SAVE ONLY SWITCH DATA |
| 1445 | FA32 | 54 | | LSR B | | |
| 1450 | FA33 | 54 | | LSR B | | |
| 1455 | FA34 | 54 | | LSR B | | |
| 1460 | FA35 | 54 | | LSR B | | |
| 1465 | FA36 | 11 | | CBA | | DID THE SWITCHES CHANGE? |
| 1470 | FA37 | 27 F1 | | BEQ | OUTNOW | |
| 1475 | FA39 | D7 01 | | STA B | SHIND | UPDATE THE INDICATOR |
| 1480 | FA3B | CE FFF0 | | LDX | #$FFF0 | TOP OF MANUAL SHUTTER |
| 1485 | FA3E | 86 07 | | LDA A | #$07 | FILTER DATA TABLE |
| 1490 | FA40 | 11 | LOOP | CBA | | |
| 1495 | FA41 | 27 04 | | BEQ | SFDATA | |
| 1500 | FA43 | 08 | | INX | | |
| 1505 | FA44 | 4A | | DEC A | | |
| 1510 | FA45 | 20 F9 | | BRA | LOOP | |
| 1515 | FA47 | E6 00 | SFDATA | LDA B | ,X | LOAD SHUTTER,FILTER DATA |
| 1520 | FA49 | DA 06 | | ORA B | MANAP | |
| 1525 | FA4B | F7 2002 | | STA B | PIA1BD | OUTPUT SHUT,APER DATA |
| 1530 | FA4E | 39 | | RTS | | |
| 1535 | FA4F | 8D 0B | MANUAL | BSR | CHECK | |
| 1540 | FA51 | BD FA87 | | LSR | RCOUNT | |
| 1545 | FA54 | BD FAF4 | | JSR | APDATA | |
| 1550 | FA57 | BD FA2B | | JSR | SHUTSW | |
| 1555 | FA5A | 20 F3 | | BRA | MANUAL | |
| 1560 | FA5C | B6 4002 | CHECK | LDA A | P1A2BD | READ MANUAL/REMOTE SWITCH |
| 1565 | FA5F | 2B 01 | | BMI | RETURN | SWITCH=1,ENABLE LATCH INTERRUPTS |
| 1570 | FA61 | 39 | | RTS | | |
| 1575 | FA62 | 86 0D | RETURN | LDA A | #$D | ENABLE CA1,CA2 HIGH TO LOW |
| 1580 | FA64 | B7 2001 | | STA A | PIA1AC | |
| 1585 | FA67 | 86 35 | | LDA A | #$35 | |
| 1590 | FA69 | B7 2003 | | STA A | PIA1BC | ENABLE SHUTTER LATCH INTERRUPT |
| 1595 | FA6C | 32 | | PUL A | | |
| 1600 | FA6D | 32 | | PUL A | | |
| 1605 | FA6E | 0E | | CLI | | |
| 1610 | FA6F | 86 0E | | LDA A | #$0E | |
| 1615 | FA71 | B7 2000 | | STA A | PIA1AD | OUTPUT TEMP DATA |
| 1620 | FA74 | C6 01 | | LDA B | #$01 | |
| 1625 | FA76 | FA FFF7 | | ORA B | ALLOUT | LOAD APER DATA |
| 1630 | FA79 | F7 2002 | | STA B | PIA1BD | OUTPUT SHUT,APER DATA |
| 1635 | FA7C | BD FADC | SWCHK | JSR | RCHECK | CHECKS MANUAL/REMOTE SWITCH |
| 1640 | FA7F | BD FA87 | | JSR | RCOUNT | CHECKS FOR A STABLE TEMPERATURE |
| 1645 | FA82 | BD F9EE | | JSR | RADATA | CHECKS APERTURE MOTOR POSITION |
| 1650 | FA85 | 20 F5 | | BRA | SWCHK | SEE IF SWITCH IS STILL IN REMOTE |
| 1655 | FA87 | D6 05 | RCOUNT | LDA A | LOOK | SAVE OLD EPROM DATA |
| 1660 | FA89 | B6 4000 | | LDA A | PIA2AD | READ NEW EPROM DATA |
| 1665 | FA8C | 84 07 | | AND A | #$07 | |
| 1670 | FA8E | 97 05 | | STA A | LOOK | SAVE NEW DATA |
| 1675 | FA90 | 11 | | CBA | | |
| 1680 | FA91 | 27 04 | | BEQ | STAYED | |
| 1685 | FA93 | 25 13 | | BCS | COOLED | |
| 1690 | FA95 | 20 2B | | BRS | HEATED | |
| 1695 | FA97 | 7C 0002 | STAYED | INC | TCOUNT | |
| 1700 | FA9A | 86 6F | | LDA A | #$6F | |
| 1705 | FA9C | 91 02 | | CMP A | TCOUNT | DATA STAYED THE SAME -- TIMES? |
| 1710 | FA9E | 27 01 | | BEQ | NULLED | |
| 1715 | FAA0 | 39 | | RTS | | |
| 1720 | FAA1 | 7F 0002 | NULLED | CLR | TCOUNT | YES IT DID |
| 1725 | FAA4 | BD FB3F | | JSR | NULLIN | |
| 1730 | FAA7 | 39 | | RTS | | |
| 1735 | FAA8 | 81 00 | COOLED | CMP A | #$00 | CHECK FOR 0 TO 7 DATA CHANGE |
| 1740 | FAAA | 27 02 | | BEQ | TRYA | IF YES, BRANCH TO HEATING |
| 1745 | FAAC | 20 04 | | BRA | COLD | IF NO, CONTINUE |
| 1750 | FAAE | C1 07 | TRYA | CMP B | #$07 | DOES OLD DATA = 7 |
| 1755 | FAB0 | 27 1A | | BEQ | HOT | |
| 1760 | FAB2 | 7C 0003 | COLD | INC | COOL | |
| 1765 | FAB5 | D6 03 | | LDA B | COOL | |

```
1770 FAB7 C1 02              CMP A    #$02       HAS TEMP COOLED TWICE?
1775 FAB9 25 06              BCS      NOWAY      NO, COOL <2
1780 FABB 7F 0003            CLR      COOL       YES,SO DO IT AGAIN
1785 FABE 7F 0002            CLR      TCOUNT
1790 FAC1 39          NOWAY  RTS
1795 FAC2 81 07       HEATED CMP A    #$07
1800 FAC4 27 02              BEQ      TRYA1
1805 FAC6 20 04              BRA      HOT
1810 FAC8 C1 00       TRYA1  CMP      B#$00
1815 FACA 27 E6              BEQ      COLD
1820 FACC 7C 0004     HOT    INC      HEAT
1825 FACF D6 04              LDA B    HEAT
1830 FAD1 C1 02              CMP B    #$02       HAS TEMP HEATED TWICE?
1835 FAD3 25 06              BCS      SKIPIT     NO, HEAT<2
1840 FAD5 7F 0004            CLR      HEAT       YES
1845 FAD8 7F 0002            CLR      TCOUNT
1850 FADB 39          SKIPIT RTS
1855 FADC B6 4002     CHECK  LDA A    PIA2BD     READ MANUAL/REMOTE SWITCH
1860 FADF 2B 02              BMI      CONTIN
1865 FAE1 20 01              BRA      MANRET     SWITCH=0,MANUAL POSITION
1870 FAE3 39          CONTIN RTS
1875 FAE4 86 04       MANRET LDA A    #$04       DISABLE CA1,CA2
1880 FAE6 B7 2001            STA A    PIA1AC
1885 FAE9 86 34              LDA A    #$34       DISABLE SHUTTER LATCH INTERRUPT
1890 FAEB B7 2003            STA A    PIA1BC
1895 FAEE 32                 PUL A
1900 FAEF 32                 PUL A
1905 FAF0 0F                 SEI
1910 FAF1 7E FA4F            JMP      MANUAL
1915 FAF4 86 40       APDATA LDA A    #$40
1920 FAF6 97 08              STA A    STOP
1925 FAF8 B6 4002     MOTO   LDA A    PIA2BD     READA/D DATA
1930 FAFB 1F                 AND A    #$1F
1935 FAFD D6 06              LDA A    MANAP      LOAD MANUAL APERTURE DATA
1940 FAFF 58                 ASL B
1945 FB00 58                 ASL B
1950 FB01 CA 01              ORA B    #$01       SET RESOLUTION BIT
1955 FB03 11                 CBA
1960 FB04 27 17              BEQ      OK
1965 FB06 86 3C              LDA A    #$3C       TURN APER READY LIGHT OFF
1970 FB08 B7 4003            STA A    PIA2BC
1975 FB0B 22 02              BHI      CCWISE
1980 FB0D 20 07              BRA      CWISE
1985 FB0F 86 40       CCWISE LDA A    #$40
1990 FB11 B7 4002            STA A    PIA2BD     TURN MOTOR
1995 FB14 20 E2              BRA      MOTO
2000 FB16 86 20       CWISE  LDA A    #$20
2005 FB18 B7 4002            STA A    PIA2BD     TURN MOTOR
2010 FB1B 20 DB              BRA      MOTO
2015 FB1D 00          OK     LDA A    #$0
2020 FB1F B7 4002            STA A    PIA2BD     SEND CODE TO STOP MOTOR
2025 FB22 8D 0B              BSR      TIME
2030 FB24 7A 0008            DEC      STOP
2035 FB27 26 CF              BNE      MOTO
2040 FB29 86 34              LDA A    #$34
2045 FB2B B7 4003            STA A    PIA2BC     LIGHT APERTURE READY LIGHT
2050 FB2E 39                 RTS
2055 FB2F CE 0032     TIME   LDX      #$32       1 MILLISECOND TIME DELAY
2060 FB32 09          TIME1  DEX
2065 FB33 01                 NOP
2070 FB34 01                 NOP
2075 FB35 01                 NOP
2080 FB36 8C 0000            CPX      #$0
2085 FB39 8C 0000            CPX      #$0
2090 FB3C 26 F4              BNE      TIME1
2095 FB3E 39                 RTS
2100 FB3F 86 34       NULLIN LDA A    #$34
2105 FB41 B7 4001            STA A    PIA2AC     TURN TEMP READY LIGHT ON
2110 FB44 7F 0002            CLR      TCOUNT
2115 FB47 39                 RTS
```

```
2120 FFCC                     ORG      $FFCC
2125 FFCC A0                  FCB      $A0              ~ 1
2130 FFCD 60                  FCB      $60              ~ 1
2135 FFCE 90                  FCB      $90              ~ 1
2140 FFCF 50                  FCB      $50              ~ 1
2145 FFD0 A8                  FCB      $A8              ~ 1
2150 FFD1 68                  FCB      $68              ~ 1
2155 FFD2 98                  FCB      $98              ~ 1
2160 FFD3 58                  FCB      $58              ~ 1
2165 FFD4 0A                  FCB      $A,$1,$C,$2      ~ 4
     FFD5 01
     FFD6 0C
     FFD7 02
2170 FFD8 0B                  FCB      $B,$3,$9,$3      ~ 4
     FFD9 03
     FFDA 09
     FFDB 03
2175 FFDC 08                  FCB      $8,$2,$7,$3      ~ 4
     FFDD 02
     FFDE 07
     FFDF 03
2180 FFE0 06                  FCB      $6,$2,$E,$1      ~ 4
     FFE1 02
     FFE2 0E
     FFE3 01
2185 FFE4 0D                  FCB      $D,$2,$E,$1      ~ 4
     FFE5 01
     FFE6 05
     FFE7 04
2190 FFE8 02                  FCB      $2,$4,$3,$3      ~ 4
     FFE9 04
     FFEA 03
     FFEB 03
2195 FFEC 02                  FCB      $4,$5,$1,$5      ~ 4
     FFED 05
     FFEE 01
     FFEF 05
2200 FFF0 58                  FCB      $58              ~ 1
2205 FFF1 50                  FCB      $50              ~ 1
2210 FFF2 68                  FCB      $68              ~ 1
2215 FFF3 60         SHIN     FCB      $60              ~ 1
2220 FFF4 98                  FCB      $98              ~ 1
2225 FFF5 90                  FCB      $90              ~ 1
2230 FFF6 A8                  FCB      $A8              ~ 1
2235 FFF7 A0         ALLOUT   FCB      $A0              ~ 1
2240 FFF8 F88D                FDB      IRQ              ~ 1
2245 FFFA F88D                FDB      SWINT            ~ 1
2250 FFFC F8DE                FDB      NMI              ~ 1
2255 FFFE F800                FDB      INIT             ~ 1
2260 XXXX                     END
```

What is claimed is:

1. A controller for an infrared heat source capable of being programmed to act as a target for a missile target seeker, in a system for testing a guidance and control section of missiles of different types, with a missile mounted on a stand with the infrared heat source; wherein the infrared heat source includes a black body, a shutter, filter means, and an aperture wheel having a plurality of apertures, a motor coupled to the aperture wheel to rotate it to select an aperture, and position detecting means for the aperture wheel, the motor and position detecting means being electrically coupled to the controller; solenoid means for operating the shutter and the filter means; means on the stand for sending to the controller temperature data, aperature data, shutter-filter data and missile identification data;

wherein the controller comprises;

a CPU comprising a microprocessor, input/output ports, and a read only memory coupled together, with the read only memory having a program stored therein for the microprocessor;

aperture control means including means in the CPU for receiving signals from the position detecting means, means for reading aperture data from the stand, means for comparing the signals from the position detecting means to the aperture data, means for sending signals to operate the motor to select an aperture such that the means for comparing indicates equality, and means for sending an aperature ready signal from the controller to the stand;

means for reading the missile identification data so that subsequent operation may be controlled depending on missile type;

temperature control means including means in the CPU, a resistance bridge circuit comprising first, second, third and fourth legs, with the black body forming resistance of the first leg is series with a resistor forming the second leg, a resistor forming the third leg, means including electronic switching means for selecting resistance means to form the fourth leg with a variable value of resistance, a power supply having first and second terminals, means including electronic device means coupled between said first terminal and a junction of the first and third legs for supplying power to the black body at different power levels, with a junction of the second and fourth legs connected to said second terminal, an instrumentation amplifier having non-inverting and inverting inputs, with the non-inverting input connected to a junction of the third and fourth legs and the inverting input connected to a junction of the first and second legs, with the voltage at the non-inverting input used as a reference voltage, means for reading temperature data designating a temperature value from the stand to the CPU, means in the CPU for converting the temperature data to a temperature code and using it to control said electronic switching means so that the reference voltage is a function of said temperature value, means coupling an output of the instrumentation amplifier to an input of the electronic device means so that a differential voltage between the non-inverting and inverting inputs of the instrumentation amplifier is used to control power supplied to the black body from said power supply, and the differential voltage is approximately zero when the black body is at the designated 55 temperature;

means for reading shutter-filter data from the stand into the CPU, and means including the CPU for using the shutter-filter data to generate signals to control the solenoid means, depending on the missile type and the shutter-filter data, to thereby move the shutter and the filter means in and out of position.

2. A controller according to claim 1, further including temperature ready means coupled to a temperature detection means integrated into the black body for indicating to the CPU whether the black body is heating, cooling, or stabilized, with means for generating a temperature-ready signal when the temperature has stabilized, and for sending the temperature-ready signal to the stand;

wherein the temperature ready means includes black body protection means for disabling said power supply in response to the temperature detected by the temperature detection means exceeding a given value;

and fuse means for the power supply for disabling the power supply in response to excessive current to thereby protect the black body.

3. A controller according to claim 1, wherein the position detecting means for the aperture wheel comprises a potentiometer having a wiper mechanically coupled to the aperture wheel and the motor, wherein the means for receiving signals from the position detecting means comprises an analog-to-digital converter which converts a voltage from the potentiometer to a digital value, outputs of the converter being coupled to a set of flip-flops for storing the digital value, with outputs of the flip-flops being used by said means for comparing the signals from the position detecting means to the aperture data.

4. A controller according to claim 1, wherein said electronic switching means of the temperature control means comprises a plurality of MOSFETs, each MOSFET having a source, a gate and a drain, with the drain of each MOSFET connected to said second terminal of the power supply, wherein the fourth leg of the bridge has a resistor connected between the non-inverting input of the instrumentation amplifier and a multiple connection point, each MOSFET having resistance means connected between its source and the multiple connection point, wherein the means using the temperature code from the CPU to control the electronic switching means includes a temperature decoder having a set of inputs coupled to the CPU for the temperature code, and wherein the temperature decoder has outputs coupled via buffers to the gates of the MOSFETs so that only one of the MOSFETs is turned on at a time;

wherein said electronic device means comprises power pass transistor means, wherein said means coupling an output of the instrumentation amplifier to an input of tile electronic device means comprises an operational amplifier followed by an emitter follower transistor circuit.

5. A controller according to claim 4, further including temperature ready means coupled to a thermocouple integrated into the black body, wherein the temperature ready means comprises an instrumentation amplifier having inputs coupled to the thermocouple, with an output of the last said instrumentation amplifier coupled via a Butterworth filter which includes an operational amplifier having an output coupled to an analog-to-digital converter which provide address inputs to a memory unit, with data from the last said memory unit indicating to the CPU whether the black body is heating, cooling, or stabilized, with means for generating a temperature-ready signal when the temperature has stabilized, and for sending the temperature-ready signal to the stand;

wherein the temperature ready means includes black body protection means having buffer means coupled between an output of the last said memory means and an input of a solid state relay, with output of the solid state relay connected in an input to a transformer of the power supply for disabling said power supply in response to the temperature detected by the temperature detection means exceeding a given value;

and fuse means for the power supply for disabling the power supply in response to excessive current to thereby protect the black body.

* * * * *